(12) United States Patent
Kato et al.

(10) Patent No.: US 7,762,577 B2
(45) Date of Patent: Jul. 27, 2010

(54) OCCUPANT LEG PROTECTING DEVICE FOR VEHICLE

(75) Inventors: Takeaki Kato, Nishikamo-gun (JP); Osamu Fukawatase, Nishikamo-gun (JP); Takuya Nezaki, Mizunami (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 448 days.

(21) Appl. No.: 11/666,161

(22) PCT Filed: Nov. 11, 2005

(86) PCT No.: PCT/JP2005/021181

§ 371 (c)(1),
(2), (4) Date: Apr. 25, 2007

(87) PCT Pub. No.: WO2006/054670

PCT Pub. Date: May 26, 2006

(65) Prior Publication Data

US 2008/0157508 A1 Jul. 3, 2008

(30) Foreign Application Priority Data

Nov. 22, 2004 (JP) ............................. 2004-337362

(51) Int. Cl.
*B60R 21/045* (2006.01)
(52) U.S. Cl. .................... 280/730.1; 280/753; 280/752; 280/732
(58) Field of Classification Search ............... 280/730.1, 280/753, 752, 732, 743.2

See application file for complete search history.

(56) References Cited

U.S. PATENT DOCUMENTS

| 3,784,223 | A | * | 1/1974 | Hass et al. ............... 280/730.1 |
| 4,262,931 | A | * | 4/1981 | Strasser et al. .............. 280/729 |
| 5,324,070 | A | | 6/1994 | Kitagawa et al. |
| 5,816,613 | A | * | 10/1998 | Specht et al. ............... 280/753 |
| 6,145,880 | A | | 11/2000 | White et al. |
| 6,435,554 | B1 | | 8/2002 | Feldman |
| 6,715,789 | B2 | * | 4/2004 | Takimoto et al. .......... 280/730.1 |
| 6,942,245 | B2 | * | 9/2005 | Takimoto et al. .......... 280/730.1 |
| 7,367,587 | B2 | * | 5/2008 | Taoka ......................... 280/751 |

(Continued)

FOREIGN PATENT DOCUMENTS

EP 0 421 572 A2 4/1991

(Continued)

*Primary Examiner*—Paul N Dickson
*Assistant Examiner*—Karen Jane J Amores
(74) *Attorney, Agent, or Firm*—Oliff & Berridge, PLC

(57) ABSTRACT

An active knee bolster (28) and a knee bolster (42), whose accommodated positions are different, are mounted within an instrument panel (18) along a curved configuration of a wall portion (24) of the instrument panel (18) which, in a vehicle transverse direction, is convex and concave in a vehicle body longitudinal direction. At a time of a vehicle body collision, a main body (30) of the active knee bolster (28) moves from an accommodated position to a leg restraining position, and a leg restraining position of the active knee bolster (28) and a leg restraining position of the fixed-type knee bolster (42) become equal positions in the vehicle body longitudinal direction. In accordance with this invention, legs of an occupant can be reliably protected, and degrees of freedom in designing a vehicle interior wall such as the instrument panel or the like are improved.

15 Claims, 14 Drawing Sheets

U.S. PATENT DOCUMENTS

| | | | |
|---|---|---|---|
| 7,571,929 B2 * | 8/2009 | Fukawatase et al. | 280/730.1 |
| 2004/0094943 A1 * | 5/2004 | Fukawatase et al. | 280/753 |
| 2008/0157508 A1 * | 7/2008 | Kato et al. | 280/730.1 |

FOREIGN PATENT DOCUMENTS

| | | |
|---|---|---|
| EP | 1 419 939 A1 | 5/2004 |
| EP | 1 504 969 A1 | 2/2005 |
| GB | 2 340 458 A | 2/2000 |
| JP | U-2-56053 | 4/1990 |
| JP | U-4-14557 | 2/1992 |
| JP | B2 2528403 | 8/1996 |
| JP | A 2001-122061 | 5/2001 |
| JP | A 2003-54352 | 2/2003 |
| JP | A-2004-224243 | 8/2004 |
| WO | WO 03/095272 A1 | 11/2003 |

* cited by examiner

OCCUPANT LEG PROTECTING DEVICE FOR VEHICLE

TECHNICAL FIELD

The present invention relates to an occupant leg protecting device for a vehicle which is mounted to a vehicle such as an automobile or the like.

BACKGROUND TECHNOLOGY

In an occupant leg protecting device for a vehicle which is mounted to a vehicle such as an automobile or the like, there has conventionally been known a structure in which a knee bolster which is movable in a vehicle body longitudinal direction is inserted into an opening hole formed in an instrument panel which is fixed to the vehicle body (see, for example, Japanese Patent Application Laid-Open (JP-A) No. 2001-122061). In this structure, after an ignition switch is set in an on state, the knee bolster is displaced, and the distance between the knee bolster and the occupant is maintained at a constant value in a normal state. Further, Japanese Patent No. 2528403 and JP-A No. 2003-54352 are other conventional techniques.

DISCLOSURE OF THE INVENTION

However, in JP-A No. 2001-122061, there is disclosed one knee bolster which restrains the left and right leg portions of the occupant. As a result, in a case in which the knee bolster is mounted to a vehicle interior wall such as the instrument panel or the like, it is difficult to match the knee bolster to the configuration of the surface of the vehicle interior wall which is convex and concave, whereby the degrees of freedom in designing the knee bolster mounting portion at the vehicle interior wall decrease.

In view of the aforementioned, an object of the present invention is to provide an occupant leg protecting device for a vehicle which can reliably protect the legs of an occupant and which can improve the degrees of freedom in designing a vehicle interior wall such as an instrument panel or the like.

In a first aspect of the present invention, an occupant leg protecting device for a vehicle has: a vehicle interior wall disposed in front of a front seat, and having, in a vehicle transverse direction, a curved configuration which is convex and concave in a vehicle body longitudinal direction; left leg protecting means, mounted to the vehicle interior wall, for restraining a left leg portion of an occupant seated on a seat at a time of a vehicle body collision; and right leg protecting means, mounted to the vehicle interior wall, for restraining a right leg portion of an occupant seated on a seat at a time of a vehicle body collision, wherein the right leg protecting means is structured such that a leg restraining position of the right leg protecting means is equal, in the vehicle body longitudinal direction, to a leg restraining position of the left leg protecting means.

In the present aspect, both the left leg protecting means and the right leg protecting means are mounted to the vehicle interior wall which disposed in front of the front seat and which has, in the vehicle transverse direction, a curved configuration which is convex and concave in the vehicle body longitudinal direction. Further, at the time of a vehicle body collision, the leg restraining position of the left leg protecting means and the leg restraining position of the right leg protecting means become equal positions in the vehicle body longitudinal direction, and both the left and right leg portions of the occupant are restrained at equal positions.

In accordance with the present aspect, regardless of the position of the vehicle interior wall such as the instrument panel or the like, the restraining position of the left leg protecting means and the restraining position of the right leg protecting means are equal positions in the vehicle body longitudinal direction. Accordingly, the left and right legs of the occupant can be restrained at the same time and at equal positions, and the legs of the occupant can be reliably protected. Further, the degrees of freedom in designing the vehicle interior wall such as the instrument panel or the like can be improved.

In a second aspect of the present invention, an occupant leg protecting device for a vehicle has: a vehicle interior wall disposed in front of a front seat; left leg protecting means, mounted to the vehicle interior wall, for restraining a left leg portion of an occupant seated on a seat at a time of a vehicle body collision; and right leg protecting means, mounted to the vehicle interior wall, for restraining a right leg portion of an occupant seated on a seat at a time of a vehicle body collision, wherein the right leg protecting means is structured such that an accommodated position of the right leg protecting means is different, in a vehicle body longitudinal direction, than an accommodated position of the left leg protecting means, and a leg restraining position of the right leg protecting means is equal, in the vehicle body longitudinal direction, to a leg restraining position of the left leg protecting means.

In accordance with the present aspect, both the left leg protecting means and the right leg protecting means, whose accommodated positions in the vehicle body longitudinal direction are different, are mounted to the vehicle interior wall which is disposed in front of the front seat. Further, at the time of a vehicle body collision, the leg restraining position of the left leg protecting means and the leg restraining position of the right leg protecting means become equal positions in the vehicle body longitudinal direction, and both the left and right leg portions of the occupant are restrained at equal positions.

In accordance with the present aspect, regardless of the position of the vehicle interior wall such as the instrument panel or the like, the restraining position of the left leg protecting means and the restraining position of the right leg protecting means are equal positions in the vehicle body longitudinal direction. Accordingly, the left and right legs of the occupant can be restrained at the same time and at equal positions, and the legs of the occupant can be reliably protected. Further, the degrees of freedom in designing the vehicle interior wall such as the instrument panel or the like can be improved.

In a third aspect of the present invention, one of the left leg protecting means and the right leg protecting means of the above-described first or second aspect is a fixed-type knee bolster, and another is an active knee bolster which, under a predetermined condition, moves from the accommodated position to the leg restraining position.

In the present aspect, in addition to the features of the above-described first and second aspect, the accommodated position and the leg restraining position of the fixed-type knee bolster are the same position. Accordingly, at the time of a vehicle body collision, under a predetermined condition, the active knee bolster moves from the accommodated position to the leg restraining position, and reaches a position equal to the leg restraining position of the fixed-type knee bolster.

In accordance with the present aspect, one of the left leg protecting means and the right leg protecting means is a fixed-type knee bolster, and the other is an active knee bolster which, under a predetermined condition, moves from the accommodated position to the leg restraining position.

Accordingly, by the active knee bolster and the fixed-type knee bolster, the left and right legs of the occupant can be reliably restrained at the same time and at equal positions, and the legs of the occupant can be reliably protected. Further, the degrees of freedom in designing the vehicle interior wall such as the instrument panel or the like can be improved.

In a fourth aspect of the present invention, both of the left leg protecting means and the right leg protecting means of the above-described first or second aspect are active knee bolsters which, under a predetermined condition, move from the accommodated positions to the leg restraining positions.

In the present aspect, in addition to the features of the above-described first and second aspect, at the time of a vehicle body collision, under a predetermined condition, the left and right active knee bolsters move from the accommodated positions, which are different in the vehicle body longitudinal direction, to the leg restraining positions, which are equal in the vehicle body longitudinal direction.

In accordance with the present aspect, both the left leg protecting means and the right leg protecting means are active knee bolsters which, under a predetermined condition, move from the accommodated positions to the leg restraining positions. Accordingly, in addition to the effects of the above-described first or second aspect, both of the active knee bolsters can reliably be moved to positions which are optimal for restraining the legs of the occupant, and the legs of the occupant can be restrained and protected at the same time. Further, the degrees of freedom in designing the vehicle interior wall can be further improved.

In a fifth aspect of the present invention, one of the left leg protecting means and the right leg protecting means of the above-described first or second aspect is a fixed-type knee bolster, and another is a knee air bag device equipped with an air bag body which, under a predetermined condition, inflates and unfolds from the accommodated position to the leg restraining position.

In the present aspect, in addition to the features of the above-described first or second aspect, the accommodated position and the leg restraining position of the fixed-type knee bolster are the same position. At the time of a vehicle body collision, under a predetermined condition, the air bag body of the knee air bag device inflates and unfolds from the accommodated position to the leg restraining position, and reaches a position equal to the leg restraining position of the fixed-type knee bolster.

In accordance with the present aspect, one of the left leg protecting means and the right leg protecting means is a fixed-type knee bolster, and the other is a knee air bag device equipped with an air bag body which, under a predetermined condition, inflates and unfolds from the accommodated position to the leg restraining position. Accordingly, in addition to the effects owing to the features of the above-described first or second aspect, by the fixed-type knee bolster and the air bag body, the legs of the occupant can be reliably restrained at the same time and at equal positions, and the legs of the occupant can be reliably protected. Further, the degrees of freedom in designing the vehicle interior wall can be further improved.

In a sixth aspect of the present invention, both of the left leg protecting means and the right leg protecting means of the above-described first aspect are knee air bag devices equipped with air bag bodies which, under a predetermined condition, inflate and unfold from the accommodated positions to the leg restraining positions.

In the present aspect, in addition to the contents recited in the first aspect, the air bag bodies of the left and right knee air bag devices move from accommodated positions, which are different therebetween in the vehicle body longitudinal direction, to leg restraining positions, which are equal in the vehicle body longitudinal direction, at the time of a vehicle body collision under a predetermined condition.

In accordance with the present aspect, both the left leg protecting means and the right leg protecting means are knee air bag devices equipped with air bag bodies which, under a predetermined condition, inflate and unfold from the accommodated positions to the leg restraining positions. Accordingly, in addition to the effects owing to the features of the above-described first aspect, both of the air bag bodies are inflated and unfolded to positions which are optimal for restraining the legs of the occupant, and can restrain and protect the legs of the occupant at the same time. Further, the degrees of freedom in designing the vehicle interior wall can be further improved.

In a seventh aspect of the present invention, the left leg protecting means and the right leg protecting means of the above-described first aspect are structured by a knee air bag device equipped with one air bag body which, under a predetermined condition, inflates and unfolds from the accommodated position to the leg restraining position.

In accordance with the present aspect, in addition to the features of the above-described first aspect, due to the inflating and unfolding of the one air bag body, whose left leg restraining portion and right leg restraining portion are at different accommodated positions in the vehicle body longitudinal direction, the position of the left leg restraining portion and the position of the right leg restraining portion become equal positions in the vehicle body longitudinal direction.

In accordance with the present aspect, the left leg protecting means and the right leg protecting means are a knee air bag device equipped with one air bag body which, under a predetermined condition, inflates and unfolds from the accommodated position to the leg restraining position. In this case, it suffices for the unfolded thickness of the one air bag body to be set in accordance with the configuration of the vehicle interior wall such as the instrument panel or the like. Therefore, designing the one air bag body can be realized without involving great changes from conventional knee air bag devices. Accordingly, in addition to the effects owing to the features of the above-described first aspect, the degrees of freedom in designing the vehicle interior wall can be further improved.

In an eighth aspect of the present invention, an occupant leg protecting device for a vehicle has: a vehicle interior wall disposed in front of a front seat, and having, in a vehicle transverse direction, a curved configuration which is convex and concave in a vehicle body longitudinal direction; and an air bag body mounted to the vehicle interior wall and restraining left and right leg portions of an occupant seated on a seat at a time of a vehicle body collision, wherein a vehicle body longitudinal direction thickness, in an inflated and unfolded state and as seen in a plan view of a vehicle body, of a region of the air bag body which region is above an operation pedal of a vehicle, is small as compared with vehicle body longitudinal direction thicknesses, in the inflated and unfolded state and as seen in the plan view of the vehicle body, of adjacent left and right regions.

In the present aspect, the air bag body, which restrains the left and right leg portions of the occupant, is mounted to the vehicle interior wall which is disposed in front of the front seat and has, in the vehicle transverse direction, a curved configuration which is convex and concave in the vehicle body longitudinal direction. Further, in a case in which the leg portion of the occupant is depressed at a region operating an operation pedal of the vehicle, the leg portion of the occupant is restrained at a region at which the vehicle body longitudinal direction thickness, in the inflated and unfolded state and as seen in the plan view of the vehicle body, is small as compared with the left and right regions at the air bag body.

In accordance with the present aspect, even in a case in which the leg portion of the occupant is depressed at a region operating an operation pedal of the vehicle, the leg of the occupant can be reliably protected. Further, the degrees of freedom in designing the vehicle interior wall such as an instrument panel or the like can be improved.

BEST MODES FOR IMPLEMENTING THE INVENTION

Figure 1:
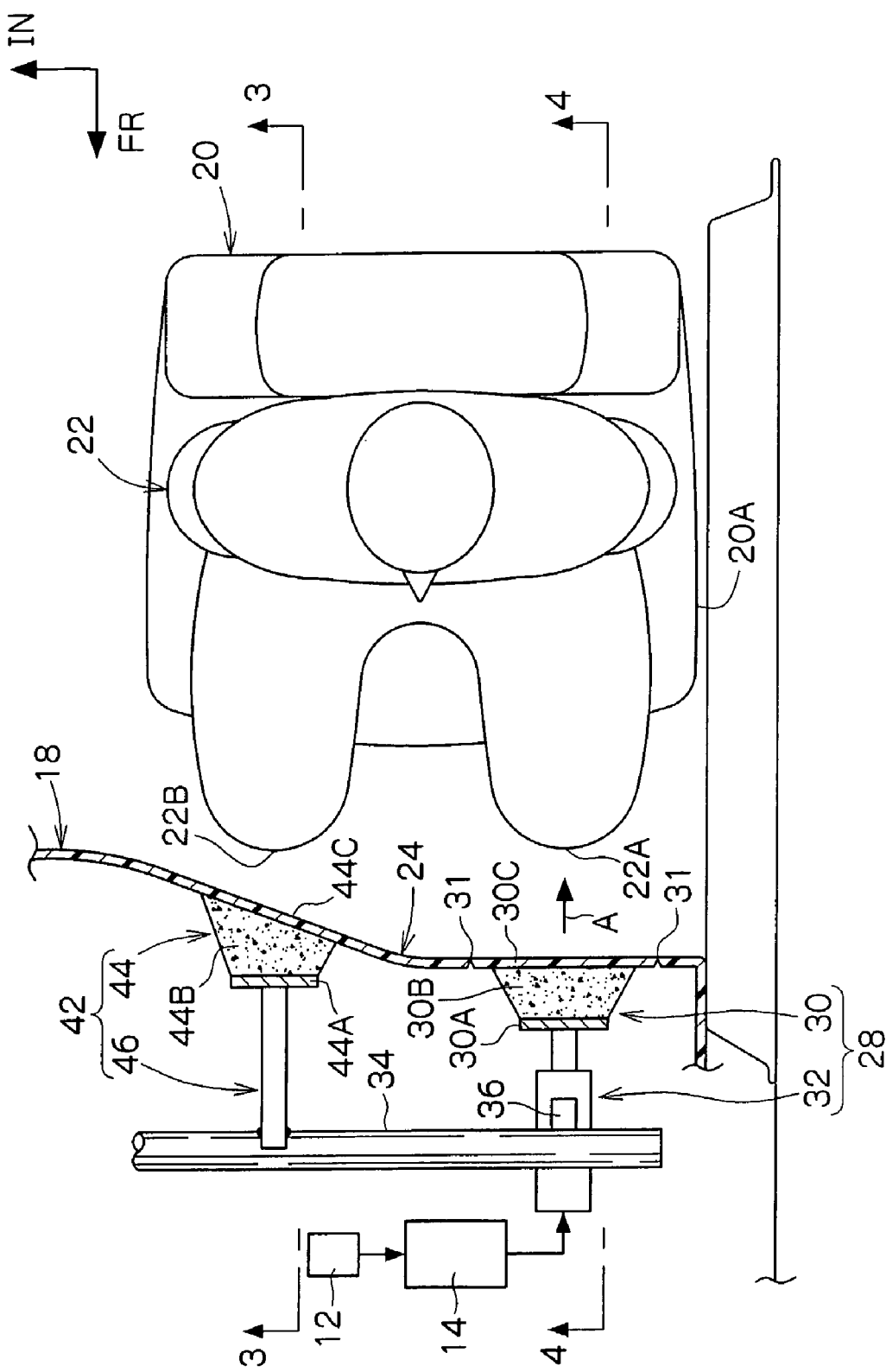
FIG. 1 is a schematic plan view, a portion of which is in cross-section, showing an occupant protecting device for a vehicle relating to a first embodiment of the present invention.

A first embodiment of an occupant protecting device for a vehicle of the present invention will be described in accordance with FIGS. 1 through 4.

Note that, in the drawings, arrow FR denotes the forward direction of a vehicle, arrow UP denotes the upward direction of the vehicle, and arrow IN denotes the transversely inward direction of the vehicle.

Figure 4:
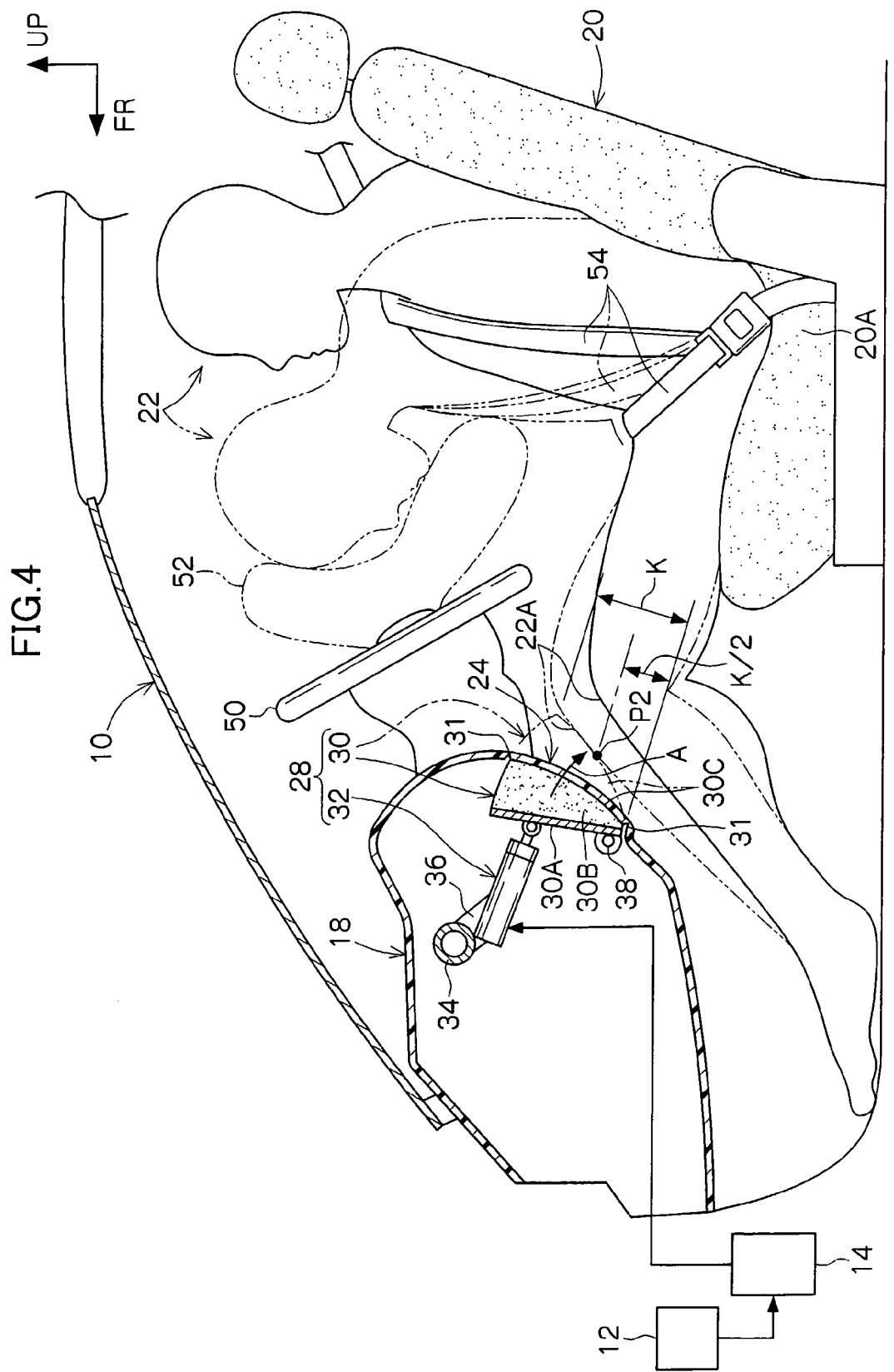
FIG. 4 is a cross-sectional view taken along line 4-4 of FIG. 1.

As shown in FIG. 4, the occupant protecting device for a vehicle of the present embodiment has an acceleration sensor 12 which senses a deceleration of a vehicle body 10 and detects a collision of the vehicle body 10. Further, the acceleration sensor 12 is connected to a control circuit 14 which is equipped with a microcomputer.

As shown in FIG. 1, at a vehicle body front side of a front seat 20 of the vehicle body 10, there is provided a wall portion 24 of an instrument panel 18 which serves as a vehicle interior wall. The wall portion 24 is positioned forward of a left leg portion 22A and a right leg portion 22B of an occupant 22 seated on the front seat 20. Further, the vehicle transverse direction inner side portion of the wall portion 24 of the instrument panel 18, which opposes the right leg portion 22B of the occupant 22, protrudes further toward the rear of the vehicle body (toward the occupant) than the vehicle transverse direction outer side portion thereof which opposes the left leg portion 22A of the occupant 22, and the wall portion 24 has, in the vehicle transverse direction, a curved configuration which is convex and concave in the vehicle body longitudinal direction.

An active knee bolster 28, which serves as a left leg protecting means, is mounted adjacent to the wall portion 24 at the vehicle body front side of the vehicle transverse direction outer side portion in the instrument panel 18.

As shown in FIG. 4, the mounting position of the active knee bolster 28 is diagonally upward and forward of a seat cushion 20A of the front seat 20. Further, the active knee bolster 28 has a main body 30 of the active knee bolster 28, and an actuator 32 serving as a driving means which moves the main body 30.

The actuator 32 of the active knee bolster 28 is fixed, via a bracket 36, to an instrument panel reinforcement 34 which is a vehicle body strength member. Further, a base plate 30A at the main body 30 of the active knee bolster 28 is flat-plate-shaped, and an energy absorbing material (EA material) 30B formed of polyurethane or the like is mounted to the occupant side surface of the base plate 30A. Moreover, a surface skin 30C formed of resin or the like is mounted to the occupant side surface of the EA material 30B.

As shown in FIG. 1, the respective configurations of the occupant side surface of the EA material 30B of the active knee bolster 28 and the surface skin 30C are rectilinear configurations which run along the vehicle transverse direction as seen in plan view, and, in the side view shown in FIG. 4, are curved configurations which are convex toward the rear of the vehicle body and extend from the vehicle body front lower side to the vehicle body rear upper side. Moreover, as shown in FIG. 1, the surface skin 30C structures a portion of the vehicle transverse direction outer side portion of the wall portion 24.

A fragile portion 31, which is formed to be thin-walled, is formed at the periphery of the surface skin 30C. When the active knee bolster 28 operates, the fragile portion 31 ruptures and the surface skin 30C separates from the wall portion 24.

The actuator 32 of the active knee bolster 28 has a cylinder and a rod which moves in the axial direction of the cylinder. Further, when the control circuit 14 judges, from an input signal from the acceleration sensor 12, that the vehicle body 10 has collided, the control circuit 14 operates the actuator 32 of the active knee bolster 28, and the rod within the cylinder extends in the axial direction.

The main body 30 of the active knee bolster 28 is pivotally supported at the vehicle body by a supporting shaft 38 which is mounted along the vehicle transverse direction to the lower portion of the base plate 30A. The main body 30 can be rotated around the supporting shaft 38 from an accommodated position shown by the solid line in FIG. 4, in the direction of the leg portion 22A of the occupant 22 (the direction of arrow A in FIG. 4).

Accordingly, when the rod of the actuator 32 extends due to gas from an inflator, the main body 30 of the active knee bolster 28 rotates and moves from the accommodated position to a leg restraining position.

As shown in FIG. 1, a fixed-type knee bolster 42 serving as a right leg protecting means is mounted adjacent to the wall portion 24 at the vehicle body front side of the vehicle transverse direction inner side portion within the instrument panel 18. The knee bolster 42 has a main body 44 of the knee bolster 42, and a bracket 46 which fixes the main body 44 to the instrument panel reinforcement 34.

Figure 3:
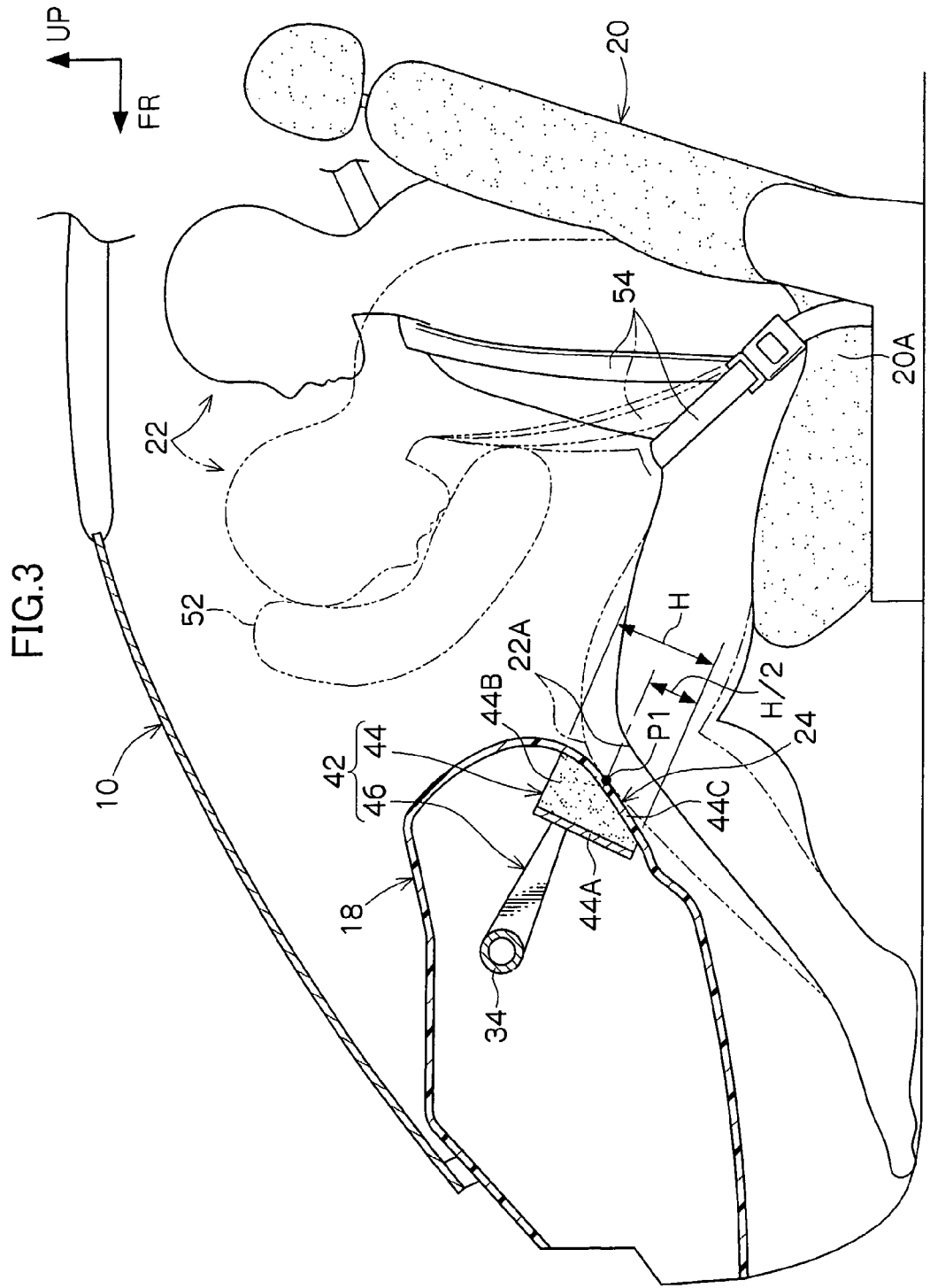
FIG. 3 is a cross-sectional view taken along line 3-3 of FIG. 1.

As shown in FIG. 3, a base plate 44A at the main body 44 of the knee bolster 42 is formed in a flat-plate-shape, and an EA material 44B formed of polyurethane or the like is mounted to the occupant side surface of the base plate 44A. Further, a surface skin 44C formed of resin or the like is mounted to the occupant side surface of the EA material 44B.

As shown in FIG. 1, the respective configurations of the occupant side surface of the EA material 44B of the knee bolster 42 and the surface skin 44C are rectilinear configurations which extend from the vehicle transverse direction front outer side toward the vehicle transverse direction rear inner side as seen in plan view, and, in the side view shown in FIG. 3, are curved configurations which are convex toward the rear of the vehicle body and extend from the vehicle body front lower side to the vehicle body rear upper side. Moreover, as shown in FIG. 1, the surface skin 44C structures a portion of the vehicle transverse direction inner side portion of the wall portion 24.

As shown in FIG. 1, an accommodated position and a leg restraining position of the main body 44 of the knee bolster 42 are the same, and as compared with a stored position of the main body 44 of the knee bolster 42, a stored position of the main body 30 of the active knee bolster 28 which is at the accommodated position is further toward the front side of the vehicle body. Further, as shown in FIG. 2, the leg restraining position of the main body 44 of the knee bolster 42 and the leg restraining position of the main body 30 of the active knee bolster 28 are equal positions in the vehicle body longitudinal direction.

Figure 2:
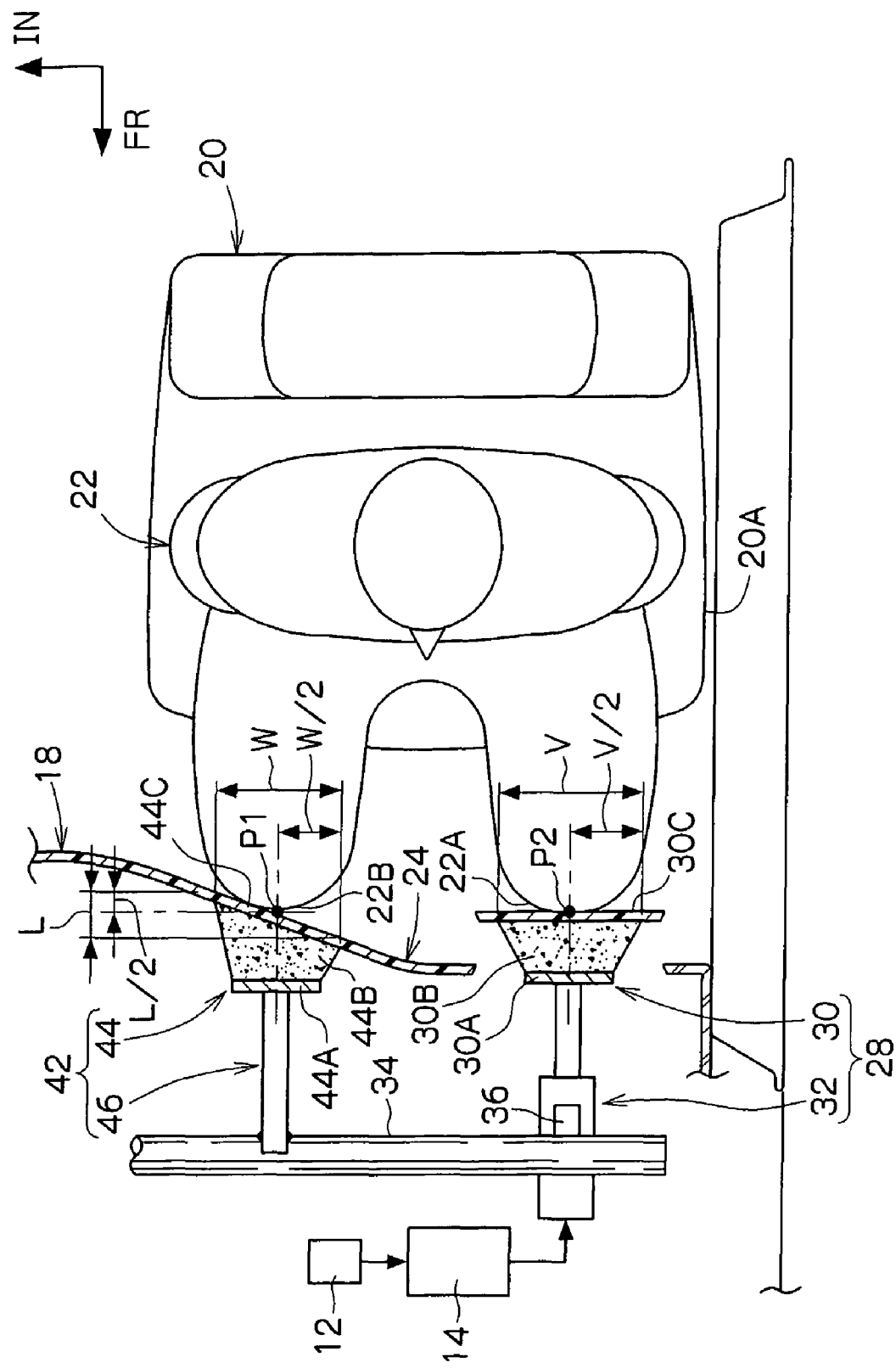
FIG. 2 is a schematic plan view, a portion of which is in cross-section, corresponding to FIG. 1 and showing an operating state of the occupant protecting device for a vehicle relating to the first embodiment of the present invention.

Namely, a point P1, which is the leg restraining position of the main body 44 of the knee bolster 42 shown in FIG. 2 and which is the central position of a width W and the central position of a longitudinal length L of the occupant side surface at the surface skin 44C abutting the right leg portion 22B of the occupant 22 and which is the central position of a vertical length H of the occupant side surface at the surface skin 44C shown in FIG. 3, and a point P2, which is the leg restraining position of the main body 30 of the active knee bolster 28 shown in FIG. 2 and is the central position of a width V and the central position of the longitudinal length (not illustrated because the longitudinal length in the present embodiment is substantially 0) of the occupant side surface at the surface skin 30C abutting the left leg portion 22A of the occupant 22 and which is the central position of a vertical length K of the occupant side surface at the surface skin 30C shown in FIG. 4, are equal positions.

Accordingly, at the time of a vehicle body collision, the left and right leg portions 22A, 22B of the occupant 22 seated in the front seat 20 can both be restrained at equal positions by the active knee bolster 28 and the knee bolster 42.

As shown in FIG. 4, an air bag device, which is equipped with an air bag body 52 for the driver's seat, is accommodated in a steering wheel 50. An inflator which operates this air bag device is connected to the control circuit 14. Further, an air bag device, which is equipped with an unillustrated air bag body for the front passenger's seat, is accommodated in the upper portion of the instrument panel 18. An inflator which operates this air bag device also is connected to the control circuit 14.

Note that numeral 54 in FIG. 3 and FIG. 4 denotes a seat belt.

Next, operation of the present embodiment will be described.

In the present embodiment, when the vehicle body 10 collides, the control circuit 14 judges from an input signal from the acceleration sensor 12 that the vehicle body 10 has collided, and operates the actuator 32 of the active knee bolster 28.

As a result, the rod of the actuator 32 extends due to the gas from the inflator, and the main body 30 of the active knee bolster 28 rotates around the supporting shaft 38 in the direction of arrow A in FIG. 4, and rotates and moves from the accommodated position shown by the solid line in FIG. 4 to the leg restraining position shown by the two-dot chain line in FIG. 4.

As shown in FIG. 2, the restraining position of the main body 30 of the active knee bolster 28 which has moved to the leg restraining position is a position which is equal, in the vehicle body longitudinal direction, to the restraining position of the main body 44 of the knee bolster 42.

Accordingly, at the time of a vehicle body collision, the left and right leg portions 22A, 22B of the occupant 22 seated on the front seat 20 can both be restrained at equal positions by the active knee bolster 28 and the knee bolster 42. Therefore, the leg portions of the occupant 22 seated on the front seat 20 can be reliably protected.

Further, in the present embodiment, as shown in FIG. 1, the accommodated position of the main body 44 of the knee bolster 42 is further toward the rear of the vehicle body than the accommodated position of the main body 30 of the active knee bolster 28. As a result, the active knee bolster 28 and the knee bolster 42 can be mounted within the instrument panel 18 along the wall portion 24 which has, in the vehicle transverse direction, a curved configuration which is convex and concave in the vehicle body longitudinal direction. Therefore, there is no need to make the wall portion 24 of the instrument panel 18, which is the vehicle interior wall, be a rectilinear configuration running along the vehicle transverse direction, and the degrees of freedom in designing the shape of the wall portion 24 are improved.

Further, in the present embodiment, because the right leg protecting means is the fixed-type knee bolster 42, the structure thereof is simple as compared with a structure in which the right leg protecting means also is made to be an active knee bolster.

Next, a second embodiment of an occupant protecting device for a vehicle of the present invention will be described in accordance with FIG. 5.

Note that the same reference numerals are applied to the same members as in the first embodiment, and description thereof is omitted.

Figure 5:
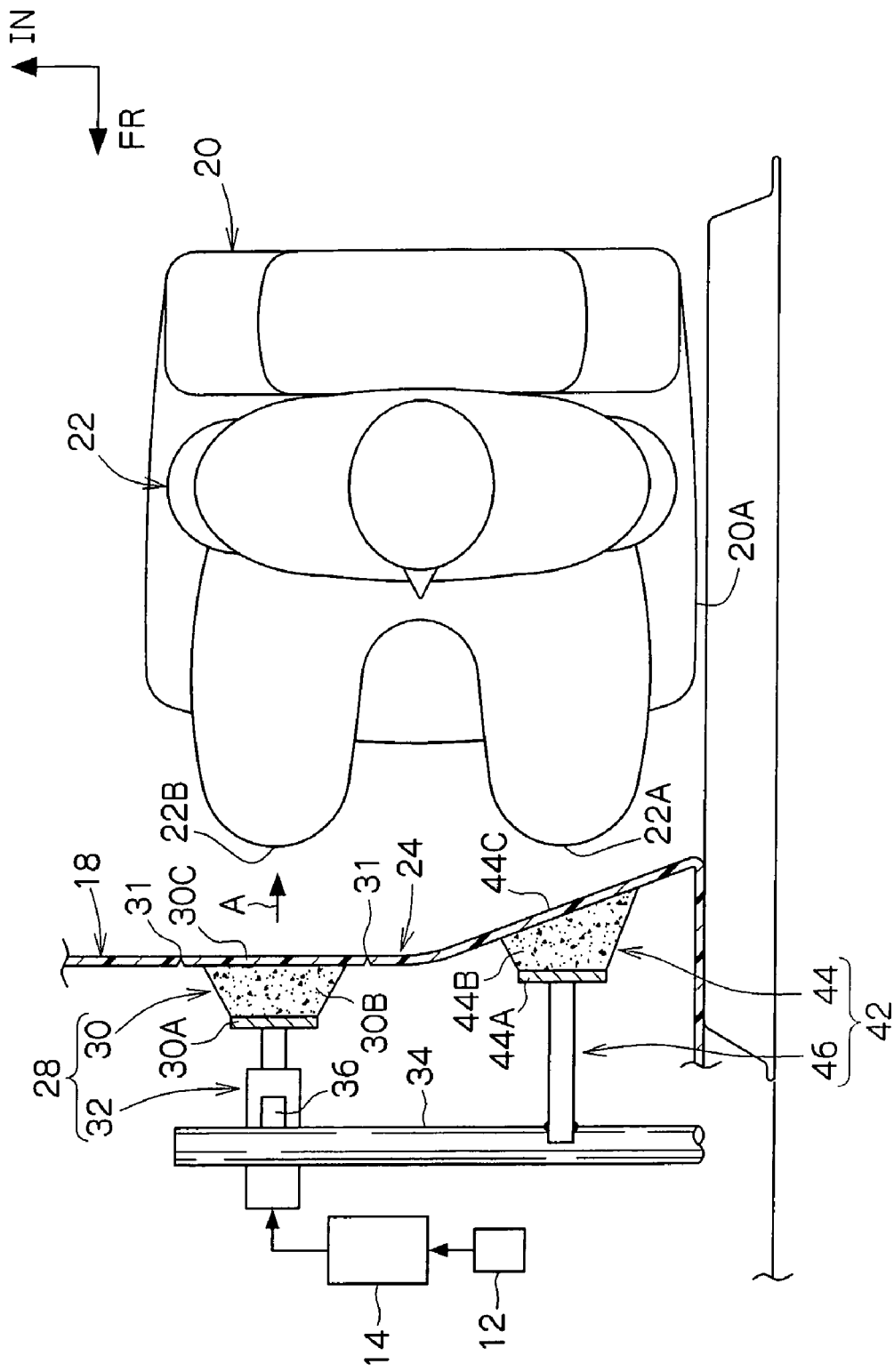
FIG. 5 is a schematic plan view, a portion of which is in cross-section, corresponding to FIG. 1 and showing an occupant protecting device for a vehicle relating to a second embodiment of the present invention.

As shown in FIG. 5, at the wall portion 24 of the instrument panel 18 of the present embodiment, the vehicle transverse direction outer side portion protrudes toward the rear of the vehicle body (toward the occupant) more than the vehicle transverse direction inner side portion, and the wall portion 24 is, in the vehicle transverse direction, a curved configuration which is convex and concave in the vehicle body longitudinal direction.

Further, the fixed-type knee bolster 42, which serves as the left leg protecting means, is mounted adjacent to the wall portion 24 at the vehicle transverse direction outer side portion within the instrument panel 18. The active knee bolster 28, which serves as the right leg protecting means, is mounted adjacent to the wall portion 24 at the vehicle body front side of the vehicle transverse direction inner side portion within the instrument panel 18.

Next, operation of the present embodiment will be described.

In the present embodiment, in the same way as in the first embodiment, at the time of a vehicle body collision, the left and right leg portions 22A, 22B of the occupant 22 seated on the front seat 20 can both be restrained at equal positions by the knee bolster 42 and the active knee bolster 28. Therefore, the leg portions of the occupant 22 seated on the front seat 20 can be reliably protected.

Further, the accommodated position of the main body 44 of the knee bolster 42 is further toward the rear of the vehicle body than the accommodated position of the main body 30 of the active knee bolster 28. As a result, the active knee bolster 28 and the knee bolster 42 can be mounted within the instrument panel 18 along the wall portion 24 which has, in the vehicle transverse direction, a curved configuration which is convex and concave in the vehicle body longitudinal direction. Therefore, there is no need to make the wall portion 24 of the instrument panel 18, which is the vehicle interior wall, be a rectilinear configuration running along the vehicle transverse direction, and the degrees of freedom in designing the shape of the wall portion 24 are improved.

Next, a third embodiment of an occupant protecting device for a vehicle of the present invention will be described in accordance with FIG. 6.

Note that the same reference numerals are applied to the same members as in the first embodiment, and description thereof is omitted.

Figure 6:
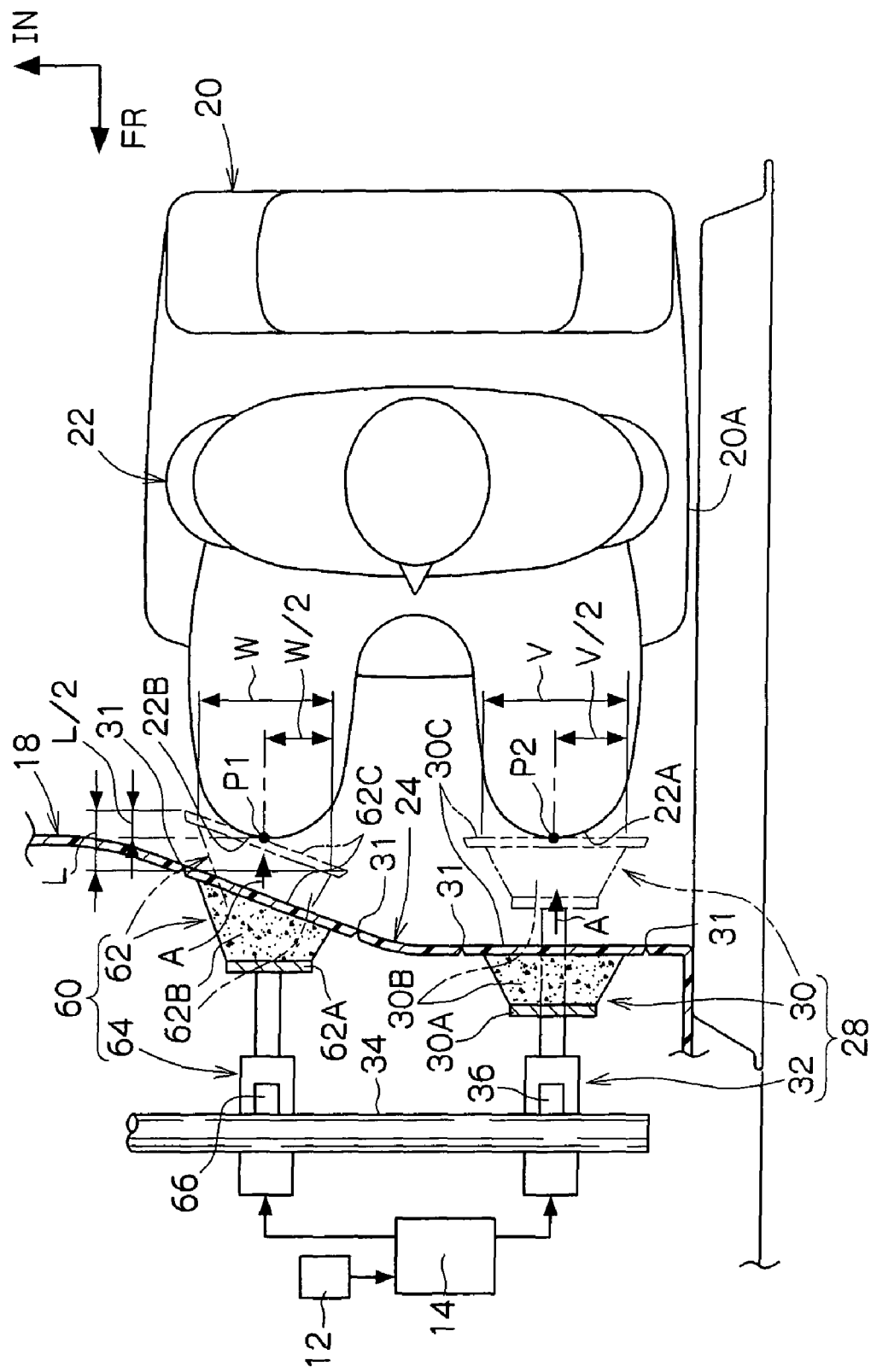
FIG. 6 is a schematic plan view, a portion of which is in cross-section, corresponding to FIG. 1 and showing an occupant protecting device for a vehicle relating to a third embodiment of the present invention.

As shown in FIG. 6, in the present embodiment, instead of the fixed-type knee bolster in the first embodiment, an active knee bolster 60 serving as a right leg protecting means is mounted adjacent to wall portion 24 at the vehicle transverse direction outer side portion within the instrument panel 18.

The active knee bolster 60 has a main body 62 of the active knee bolster 60, and an actuator 64 serving as a driving means which moves the main body 62. Because the operation mechanism of the main body 62 of the active knee bolster 60 has the same structure as that of the active knee bolster 28, detailed description thereof will be omitted.

The actuator 64 of the active knee bolster 60 is fixed, via a bracket 66, to the instrument panel reinforcement 34. Further, the respective configurations of an occupant side surface of an EA material 62B mounted to the occupant side surface of a base plate 62A at the main body 62 of the active knee bolster 60, and a surface skin 62C, are rectilinear configurations which extend from the vehicle transverse direction front outer side toward the vehicle transverse direction rear inner side in plan view, and, in side view which is omitted from the drawings, are curved configurations which are convex toward the rear of the vehicle body and extend from the vehicle body front lower side to the vehicle body rear upper side in the same way as the active knee bolster 28. Moreover, the surface skin 62C structures a portion of the vehicle transverse direction inner side portion of the wall portion 24.

As shown by the solid line in FIG. 6, an accommodated position of the main body 62 of the active knee bolster 60 which is at an accommodated position, is further toward the rear of the vehicle body than the accommodated position of the main body 30 of the active knee bolster 28.

As shown by the two-dot chain line in FIG. 6, a leg restraining position of the main body 62 of the active knee bolster 60 which has moved to the leg restraining position, and the leg restraining position of the main body 30 of the active knee bolster 28, are equal positions.

Namely, a point P1, which, at the leg restraining position of the main body 62 of the active knee bolster 60, is the central position of the width W and the central position of the longitudinal length L and the central position of a vertical length (not shown in side view) of the occupant side surface at the surface skin 62C abutting the right leg portion 22B of the occupant 22, and a point P2, which, at the leg restraining position of the main body 30 of the active knee bolster 28, is the central position of the width V and the central position of the longitudinal length (not illustrated because the longitudinal length in the present embodiment is substantially 0) and the central position of the vertical length K (see FIG. 4) of the occupant side surface at the surface skin 30C abutting the left leg portion 22A of the occupant 22, are equal positions.

Accordingly, at the time of a vehicle body collision, the left and right leg portions 22A, 22B of the occupant 22 seated in the front seat 20 can both be restrained at equal positions by the active knee bolster 28 and the active knee bolster 60.

Next, operation of the present embodiment will be described.

In the present embodiment, when the vehicle body 10 collides, the control circuit 14 judges from an input signal from the acceleration sensor 12 that the vehicle body 10 has collided, and operates the actuator 32 of the active knee bolster 28 and the actuator 64 of the active knee bolster 60.

As a result, the rods of the actuators 32, 64 extend due to the gases from the inflators, and the main bodies 30, 62 of the active knee bolsters 28, 60 move from the accommodated positions shown by the solid lines in FIG. 6 to the leg restraining positions shown by the two-dot chain lines in FIG. 6.

Further, the leg restraining position of the main body 30 of the active knee bolster 28, and the leg restraining position of the main body 62 of the active knee bolster 60, are equal positions in the vehicle body longitudinal direction.

Accordingly, at the time of a vehicle body collision, the left and right leg portions 22A, 22B of the occupant 22 seated on the front seat 20 can both be restrained at equal positions by the active knee bolster 28 and the active knee bolster 60. Therefore, the leg portions of the occupant 22 seated on the front seat 20 can be reliably protected.

Further, as shown in FIG. 6, the accommodated position of the main body 62 of the active knee bolster 60 is further toward the rear of the vehicle body than the accommodated position of the main body 30 of the active knee bolster 28. As a result, the active knee bolster 28 and the active knee bolster 60 can be mounted within the instrument panel 18 along the wall portion 24 which has, in the vehicle transverse direction, a curved configuration which is convex and concave in the vehicle body longitudinal direction. Therefore, there is no need to make the wall portion 24 of the instrument panel 18, which is the vehicle interior wall, be a rectilinear configuration running along the vehicle transverse direction, and the degrees of freedom in designing the shape of the wall portion 24 are improved.

Further, in the present embodiment, because the left and right leg protecting means are the active knee bolsters 28, 60, the degrees of freedom in designing the shape of the wall portion 24 can be improved as compared with a structure in which one of the leg protecting means is made to be the fixed-type knee bolster.

Next, a fourth embodiment of an occupant protecting device for a vehicle of the present invention will be described in accordance with FIG. 7 and FIG. 8.

Note that the same reference numerals are applied to the same members as in the first embodiment, and description thereof is omitted.

Figure 7:
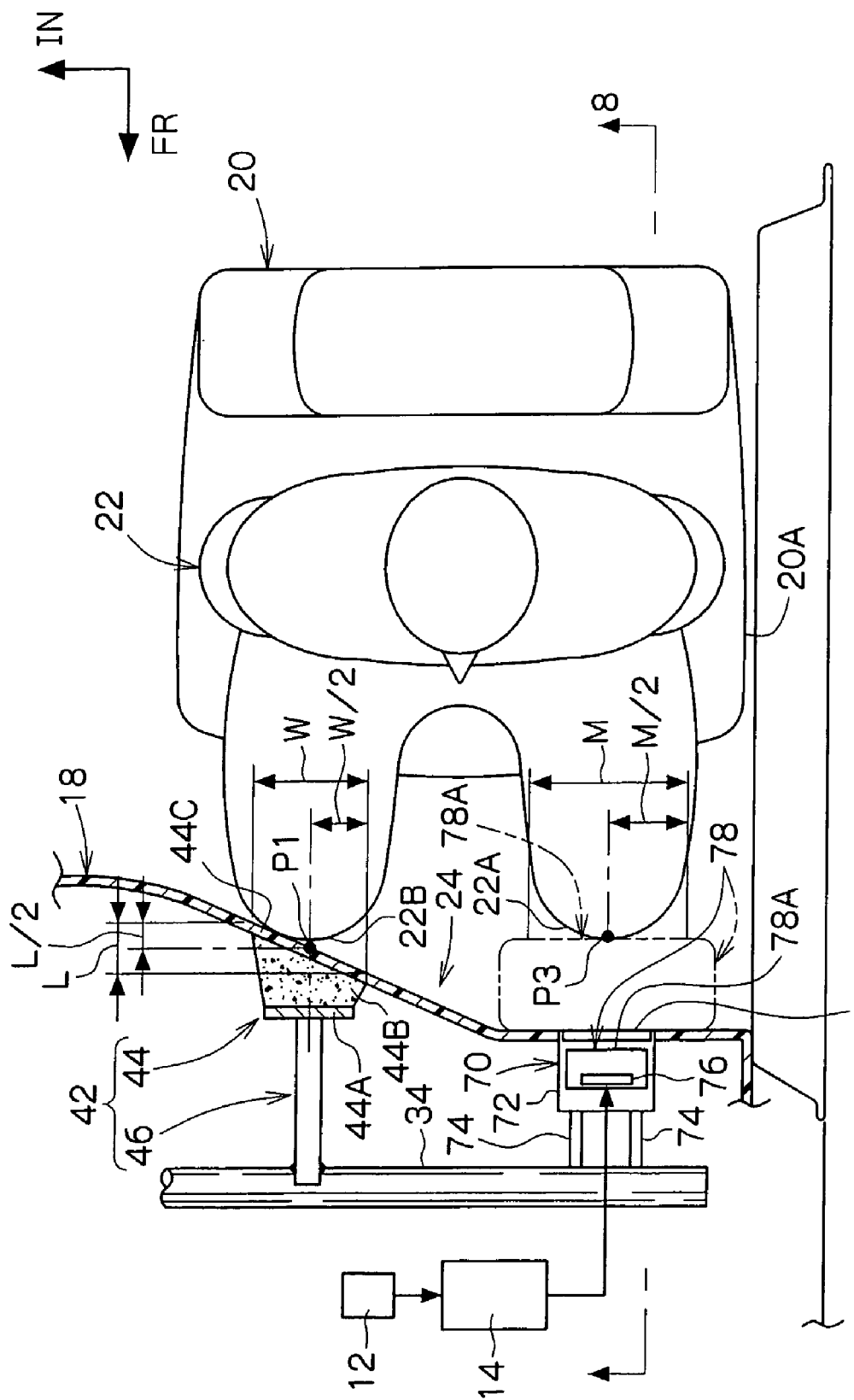
FIG. 7 is a schematic plan view, a portion of which is in cross-section, corresponding to FIG. 1 and showing an occupant protecting device for a vehicle relating to a fourth embodiment of the present invention.

As shown in FIG. 7, in the present embodiment, instead of the active knee bolster in the first embodiment, a knee air bag device 70 serving as a left leg protecting means is mounted adjacent to the wall portion 24 at the vehicle body front side of the vehicle transverse direction outer side portion within the instrument panel 18.

Figure 8:
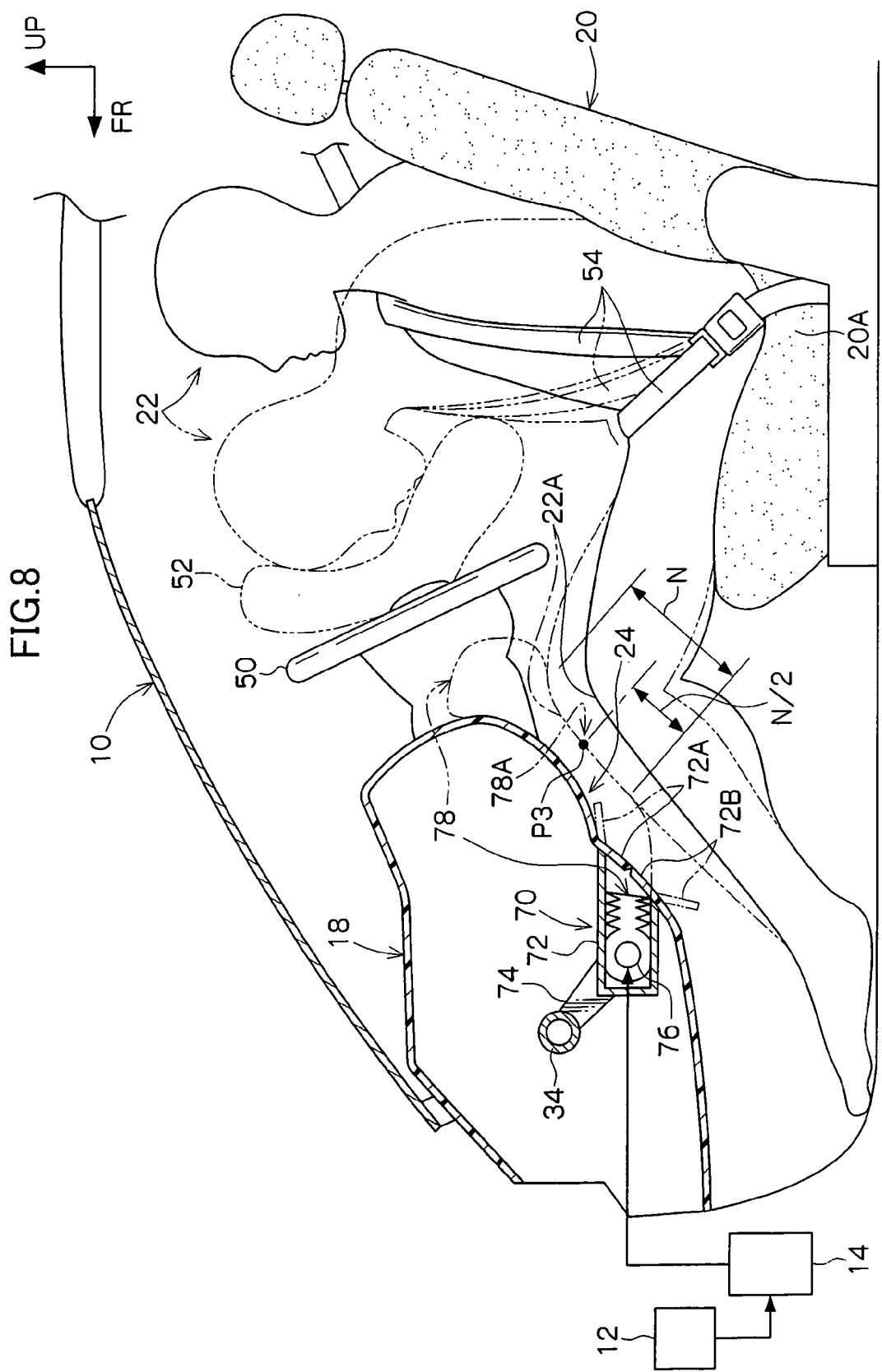
FIG. 8 is a cross-sectional view taken along line 8-8 of FIG. 7.

As shown in FIG. 8, a case 72 of the knee air bag device 70 is fixed to the instrument panel reinforcement 34 via a bracket 74. Further, as shown in FIG. 7, upper and lower cover portions 72A, 72B, which are provided at the vehicle body rear side portion of the case 72, structure a portion of the vehicle transverse direction outer side portion at the wall portion 24 of the instrument panel 18.

An inflator 76 serving as a driving means and an air bag body 78 are accommodated within the case 72 of the knee air bag device 70. Due to gas which is jetted out from the inflator 76, the air bag body 78 inflates and unfolds toward the left leg portion 22A of the occupant 22 as shown by the two-dot chain line in FIG. 8.

The accommodated position of the main body 44 of the knee bolster 42 is further toward the rear of the vehicle body than an accommodated position of the air bag body 78 which is at the accommodated position in a folded-up state shown by the solid line in FIG. 7.

Further, when the air bag body 78 inflates and unfolds, the cover portions 72A, 72B of the case 72 open outwardly in the vertical direction as shown by the two-dot chain lines in FIG. 8.

The inflator 76 of the knee air bag device 70 is connected to the control circuit 14. When the control circuit 14 judges, from an input signal from the acceleration sensor 12, that the vehicle body 10 has collided, the control circuit 14 operates the inflator 76.

As shown by the two-dot chain line in FIG. 7, a restraining position of a leg protecting portion 78A of the air bag body 78 which has inflated and unfolded, and the restraining position of the main body 44 of the knee bolster 42, are equal positions in the vehicle body longitudinal direction.

Namely, a point P1, which, at the leg restraining position of the main body 44 of the knee bolster 42, is the central position of the width W and the central position of the longitudinal length L and the central position of the vertical length H (see FIG. 3) of the occupant side surface at the surface skin 44C abutting the right leg portion 22B of the occupant 22, and a point P3, which, at the leg restraining position of the air bag body 78 of the knee air bag device 70, is the central position of a width M and the central position of a vertical length N shown in FIG. 8 of the occupant side surface abutting the left leg portion 22A of the occupant 22, are equal positions.

Accordingly, at the time of a vehicle body collision, the left and right leg portions 22A, 22B of the occupant 22 seated in the front seat 20 can both be restrained at equal positions by the air bag body 78 and the knee bolster 42.

Next, operation of the present embodiment will be described.

In the present embodiment, when the vehicle body 10 collides, the control circuit 14 judges from an input signal from the acceleration sensor 12 that the vehicle body 10 has collided, and operates the inflator 76 of the knee air bag device 70. As a result, as shown by the two-dot chain lines in FIG. 7 and FIG. 8, the air bag body 78 is inflated and unfolded toward the left leg portion 22A of the occupant 22 by the gas from the inflator 76.

Further, as shown by the two-dot chain line in FIG. 7, the leg restraining position of the leg protecting portion 78A of the air bag body 78 which is inflated and unfolded, and the leg restraining position of the main body 44 of the knee bolster 42, are equal positions in the vehicle body longitudinal direction.

Accordingly, at the time of a vehicle body collision, the left and right leg portions 22A, 22B of the occupant 22 seated on the front seat 20 can both be restrained at equal positions by the air bag body 78 and the knee bolster 42. Therefore, the leg portions of the occupant 22 seated on the front seat 20 can be reliably protected.

Further, in the present embodiment, the accommodated position of the main body 44 of the knee bolster 42 is further toward the rear of the vehicle body than the accommodated position of the air bag body 78 which is at the accommodated position in a folded-up state shown by the solid line in FIG. 7. The accommodated position of the main body 44 of the knee bolster 42 is further toward the rear of the vehicle body than the knee air bag device 70.

As a result, the knee air bag device 70 and the knee bolster 42 can be mounted to the instrument panel 18 along the wall portion 24 which has, in the vehicle transverse direction, a curved configuration which is convex and concave in the vehicle body longitudinal direction. Therefore, there is no need to make the wall portion 24 of the instrument panel 18, which is the vehicle interior wall, be a rectilinear configuration running along the vehicle transverse direction, and the degrees of freedom in designing the shape of the wall portion 24 are improved.

Further, in the present embodiment, because the right leg protecting means is the fixed-type knee bolster 42, the structure is simple as compared with a structure in which the right leg protecting means as well is a knee air bag device.

Next, a fifth embodiment of an occupant protecting device for a vehicle of the present invention will be described in accordance with FIG. 9 through FIG. 11.

Note that the same reference numerals are applied to the same members as in the first embodiment, and description thereof is omitted.

Figure 9:
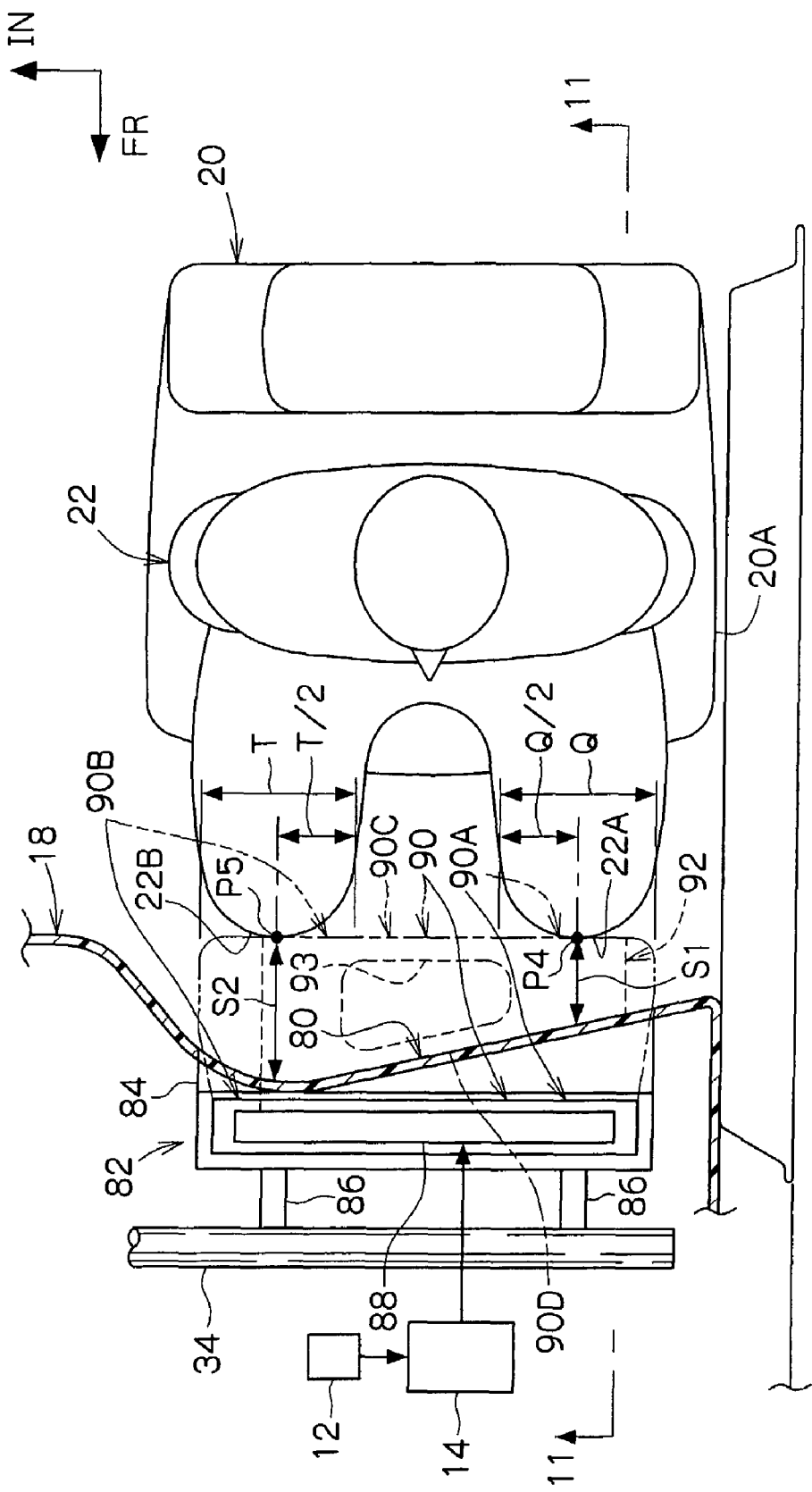
FIG. 9 is a schematic plan view, a portion of which is in cross-section, corresponding to FIG. 1 and showing an occupant protecting device for a vehicle relating to a fifth embodiment of the present invention.

As shown in FIG. 9, in the present embodiment, a wall portion 80 of the instrument panel 18 is disposed at the vehicle body front side of the front seat 20 of the vehicle body 10. The wall portion 80 is positioned at the front of the left leg portion 22A and the right leg portion 22B of the occupant 22 seated on the front seat 20.

Further, the vehicle transverse direction outer side portion of the wall portion 80 of the instrument panel 18 which opposes the left leg portion 22A of the occupant 22, protrudes toward the rear of the vehicle body (toward the occupant) as compared with the vehicle transverse direction inner side portion which opposes the right leg portion 22B of the occupant 22, and the wall portion 80 has, in the vehicle transverse direction, a curved configuration which is convex and concave in the vehicle body longitudinal direction. Further, a knee air bag device 82 serving as a left and right leg protecting means is mounted to a region adjacent to the wall portion 80 within the instrument panel 18.

Figure 11:
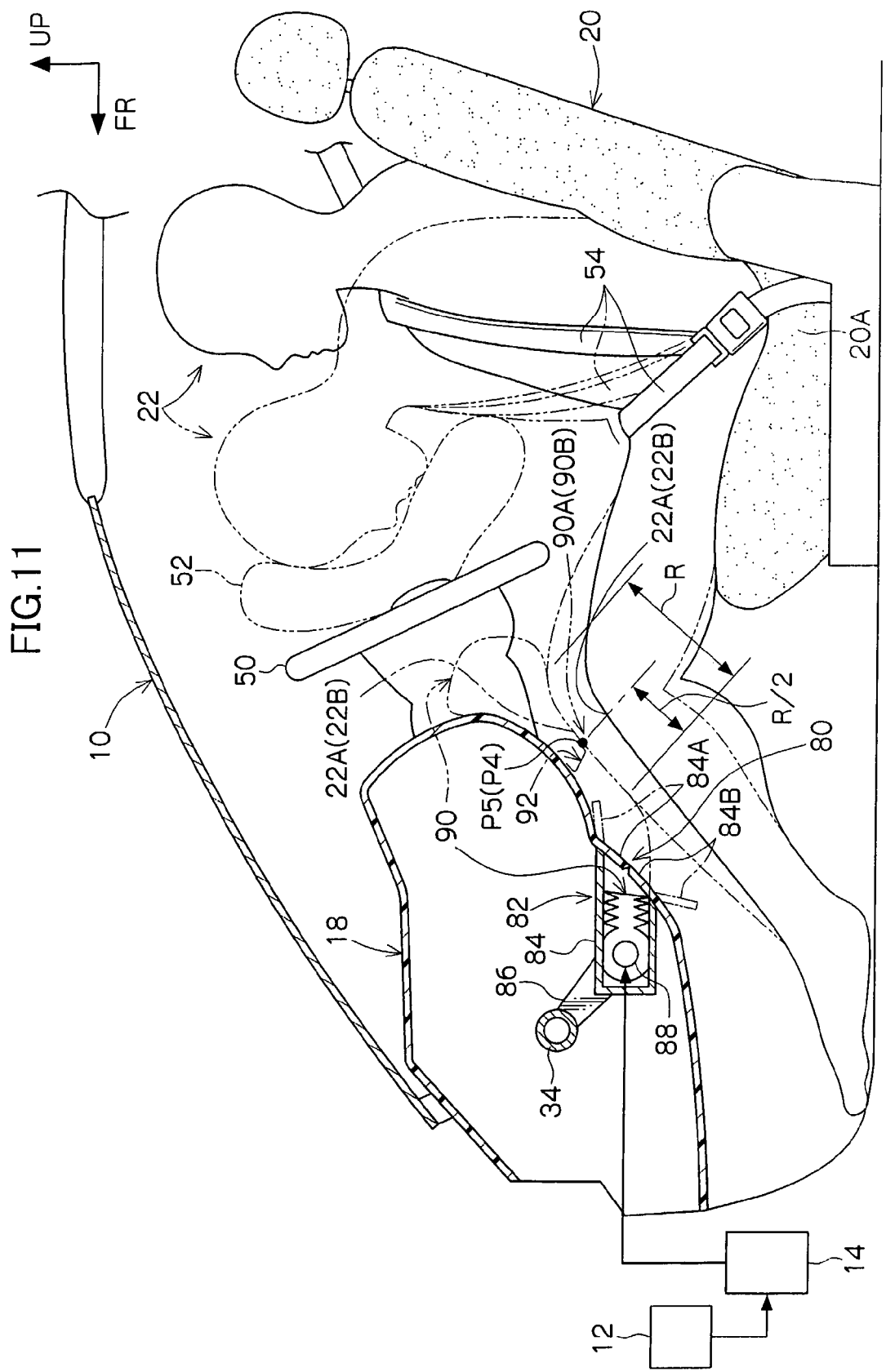
FIG. 11 is a cross-sectional view taken along line 11-11 of FIG. 9.

As shown in FIG. 11, a case 84 of the knee air bag device 82 is fixed to the instrument panel reinforcement 34 via a bracket 86. Upper and lower cover portions 84A, 84B, which are provided at the vehicle body rear side portion of the case 84, structure a portion of the wall portion 80 of the instrument panel 18.

An inflator 88 serving as a driving means and an air bag body 90 are accommodated within the case 84 of the knee air bag device 82. Due to gas which is jetted out from the inflator 88, the air bag body 90 inflates and unfolds toward the left and right leg portions 22A, 22B of the occupant 22 as shown by the two-dot chain line in FIG. 11. Further, when the air bag body 90 inflates and unfolds, the cover portions 84A, 84B of the case 84 open outwardly in the vertical direction as shown by the two-dot chain lines in FIG. 11.

The knee air bag device 82 shown by the solid line in FIG. 9 is mounted along the vehicle transverse direction.

The inflator 88 of the knee air bag device 82 is connected to the control circuit 14. When the control circuit 14 judges, from an input signal from the acceleration sensor 12, that the vehicle body 10 has collided, the control circuit 14 operates the inflator 88.

Figure 10:
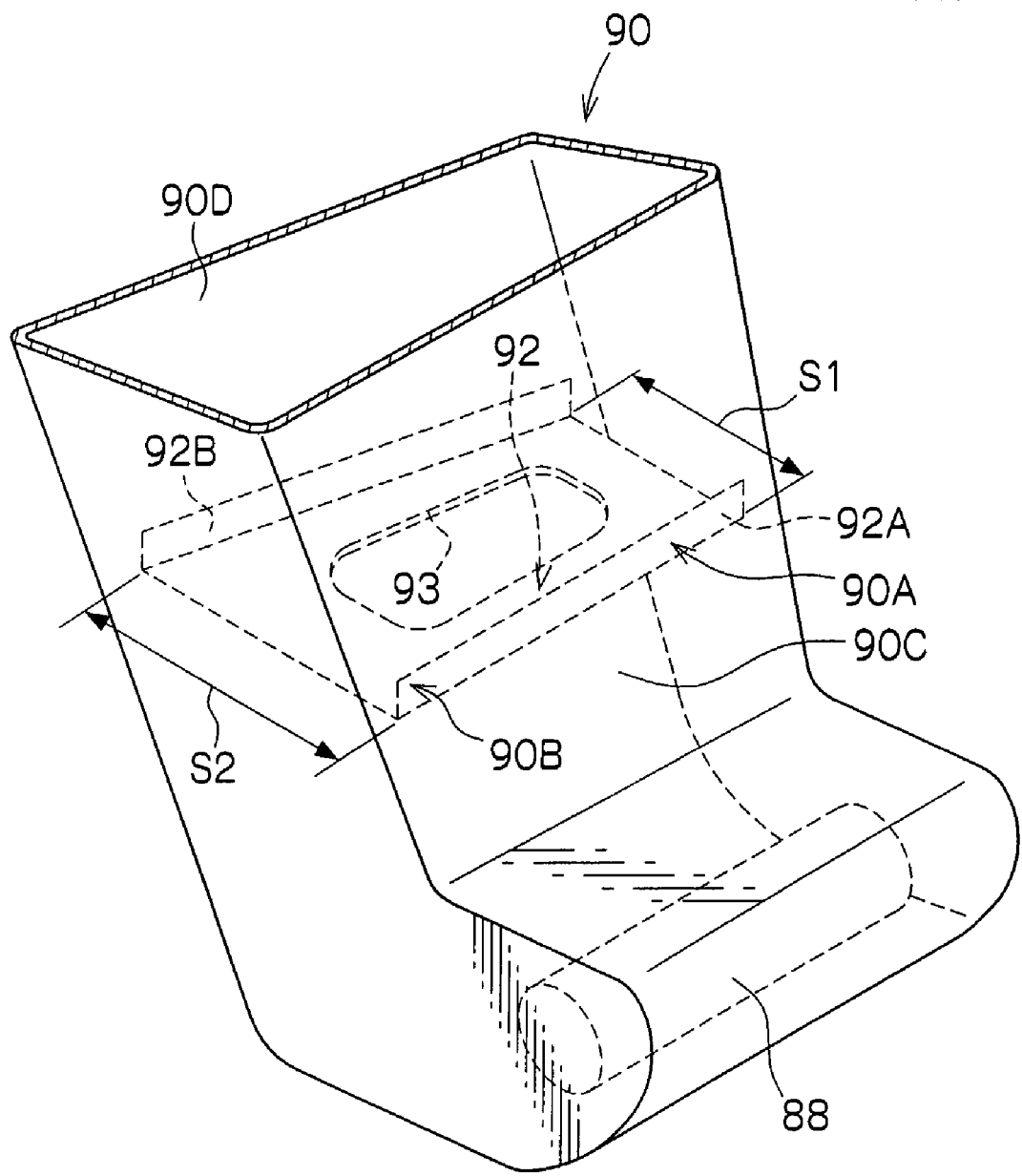
FIG. 10 is a perspective view, a portion of which is in cross-section, as seen from the front, inner side of a vehicle body at an incline and showing an air bag body of the occupant protecting device for a vehicle relating to the fifth embodiment of the present invention.

As shown in FIG. 10, a connecting fabric 92, which determines the inflated and unfolded configuration of the air bag body 90, is mounted to the interior of the air bag body 90. The connecting fabric 92 connects a front wall portion 90C and a rear wall portion 90D of the air bag body 90 from a left leg protecting portion 90A to a right leg protecting portion 90B of the air bag body 90. An air hole 93 of the gas which inflates and unfolds the air bag body 90 is formed in the connecting fabric 92.

Namely, at the region which becomes the vehicle body front side of the left and right leg portions 22A, 22B of the occupant 22, a front edge portion 92A of the connecting fabric 92 is fixed by sewing or the like to the front wall portion 90C of the air bag body 90, and a rear edge portion 92B of the connecting fabric 92 is fixed by sewing or the like to the rear wall portion 90D of the air bag body 90.

The connecting fabric 92 has a trapezoidal configuration in which the rear edge portion 92B is a straight line extending in the vehicle transverse direction, and the front edge portion 92A is inclined from the vehicle transverse direction outer side rear toward the vehicle transverse direction inner side front. With regard to the longitudinal direction width of the connecting fabric 92, a width S1 of the vehicle transverse direction outer side thereof is more narrow than a width S2 of the vehicle transverse direction inner side thereof.

Accordingly, as shown by the two-dot chain line in FIG. 9, when the air bag body 90 inflates and unfolds, the leg restraining position of the left leg protecting portion 90A at the air bag body 90, and the leg restraining position of the right leg protecting portion 90B, are equal in the vehicle body longitudinal direction.

Namely, a point P4, which is at the left leg protecting portion 90A of the air bag body 90 of the knee air bag device 82 shown in FIG. 9 and which is the central position of a width Q and the central position of a vertical length R shown in FIG. 11 of the occupant side surface abutting the left leg portion 22A of the occupant 22, and a point P5, which is at the right leg protecting portion 90B of the air bag body 90 shown in FIG. 9 and which is the central position of a width T and the central position of the vertical length R shown in FIG. 11 of the occupant side surface abutting the right leg portion 22B of the occupant 22, are equal in the vehicle body longitudinal direction.

Accordingly, at the time of a vehicle body collision, the left and right leg portions 22A, 22B of the occupant 22 seated in the front seat 20 can both be restrained at equal positions by the one air bag body 90.

Next, operation of the present embodiment will be described.

In the present embodiment, when the control circuit 14 judges from an input signal from the acceleration sensor 12 that the vehicle body 10 has collided, the control circuit 14 operates the inflator 88 of the knee air bag device 82.

As a result, as shown by the two-dot chain lines in FIG. 9 and FIG. 11, due to the gas from the inflator 88, the air bag body 90 inflates and unfolds toward the left and right leg portions 22A, 22B of the occupant 22.

Further, as shown by the two-dot chain line in FIG. 9, due to the connecting fabric 92, the leg restraining position of the left leg protecting portion 90A at the air bag body 90, and the leg restraining position of the right leg protecting portion 90B, are equal in the vehicle body longitudinal direction.

As a result, at the time of a vehicle body collision, the left and right leg portions 22A, 22B of the occupant 22 seated in the front seat 20 can both be restrained at equal positions by the one air bag body 90. Therefore, the leg portions of the occupant 22 seated in the front seat 20 can reliably be protected.

Further, in the present embodiment, the knee air bag device 82 shown by the solid line in FIG. 9 can be mounted within the instrument panel 18 which has the wall portion 80 which, in the vehicle transverse direction, has a curved configuration which is convex and concave in the vehicle body longitudinal direction. Therefore, there is no need to make the wall portion 80 of the instrument panel 18, which is the vehicle interior wall, be a rectilinear configuration running along the vehicle transverse direction, and the degrees of freedom in designing the shape of the wall portion 80 are improved.

Further, in the present embodiment, because the leg protecting means at the left and right is structured by the knee air bag device 82 which is provided with the one air bag body 90, the structure can be made to be simple as compared with a structure in which the means is made to be separate knee air bag devices at the left and the right. Further, this can be realized without involving great changes from conventional knee air bag devices.

Next, a sixth embodiment of an occupant protecting device for a vehicle of the present invention will be described in accordance with FIG. 12.

Note that the same reference numerals are applied to the same members as in the fifth embodiment, and description thereof is omitted.

Figure 12:
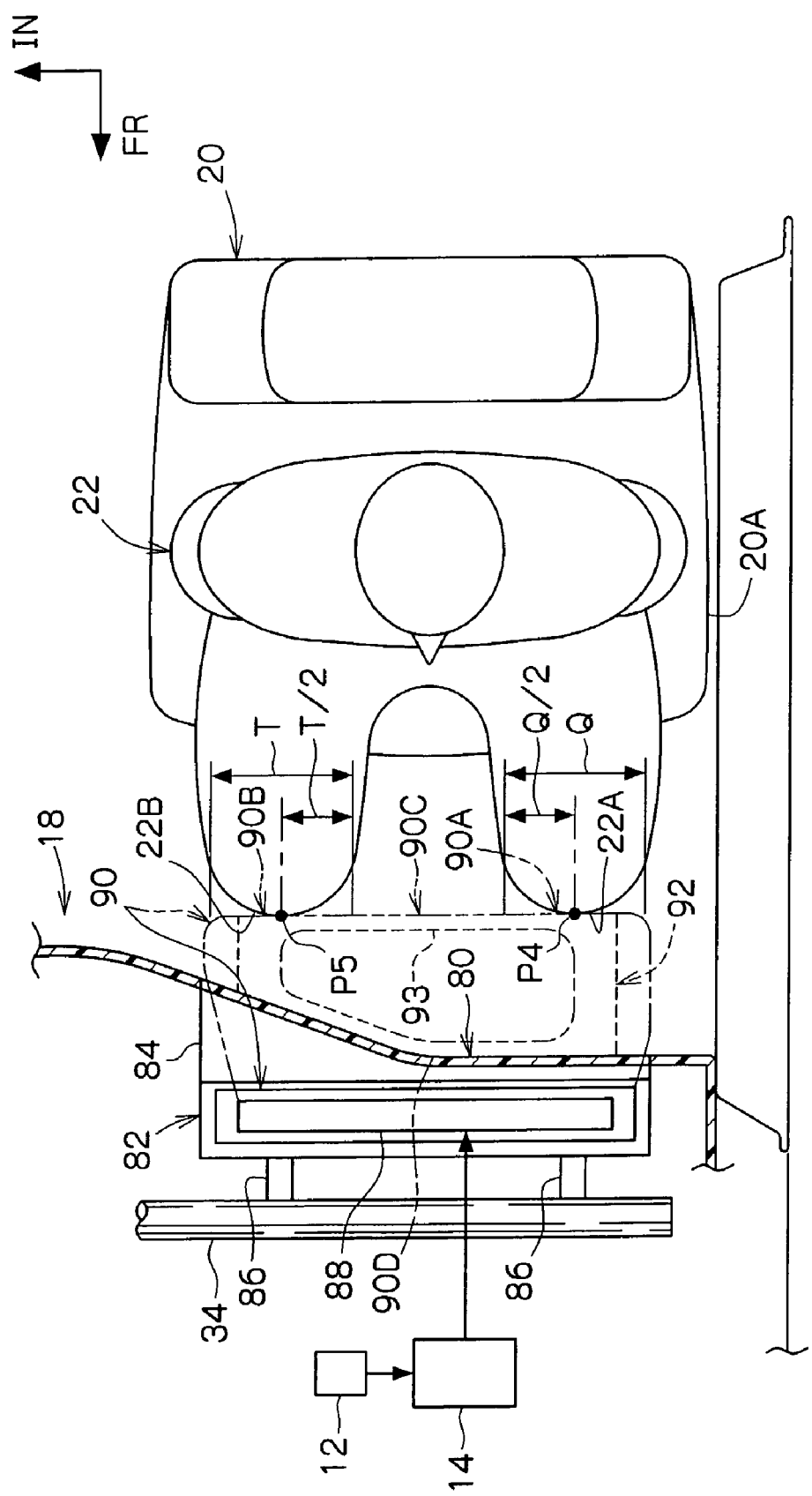
FIG. 12 is a schematic plan view, a portion of which is in cross-section, corresponding to FIG. 1 and showing an occupant protecting device for a vehicle relating to a sixth embodiment of the present invention.

As shown in FIG. 12, in the present embodiment, the vehicle transverse direction inner side portion at the wall portion 80 of the instrument panel 18 protrudes out toward the rear of the vehicle body (toward the occupant) as compared with the vehicle transverse direction outer side portion, and is formed, in the vehicle transverse direction, in a curved configuration which is convex and concave in the vehicle body longitudinal direction.

The knee air bag device 82 shown by the solid line in FIG. 12 is mounted along the vehicle transverse direction.

Further, as shown by the two-dot chain line in FIG. 12, when the air bag body 90 inflates and unfolds, the longitudinal direction positions of the leg restraining position of the left leg protecting portion 90A at the air bag body 90, and the leg restraining position of the right leg protecting portion 90B, are equal. Accordingly, at the time of a vehicle body collision, the left and right leg portions 22A, 22B of the occupant 22 seated in the front seat 20 can both be restrained at equal positions by the one air bag body 90.

Namely, a point P4, which is at the left leg protecting portion 90A of the air bag body 90 of the knee air bag device 82 shown in FIG. 12 and which is the central position of the width Q and the central position of the vertical length R in the same way as in FIG. 11 of the occupant side surface abutting the left leg portion 22A of the occupant 22, and a point P5, which is at the right leg protecting portion 90B of the air bag body 90 shown in FIG. 12 and which is the central position of the width T and the central position of the vertical length R in the same way as in FIG. 11 of the occupant side surface abutting the right leg portion 22B of the occupant 22, are equal in the vehicle body longitudinal direction.

Next, operation of the present embodiment will be described.

In the present embodiment, in the same way as in the fifth embodiment, at the time of a vehicle body collision, the left and right leg portions 22A, 22B of the occupant 22 seated in the front seat 20 can both be restrained at equal positions by the one air bag body 90.

Further, as shown by the solid line in FIG. 12, the knee air bag device 82 can be mounted within the instrument panel 18 which has the wall portion 80 which, in the vehicle transverse direction, has a curved configuration which is convex and concave in the vehicle body longitudinal direction. Therefore, there is no need to make the wall portion 80 of the instrument panel 18, which is the vehicle interior wall, be a rectilinear configuration running along the vehicle transverse direction, and the degrees of freedom in designing the shape of the wall portion 80 are improved.

Next, a seventh embodiment of an occupant protecting device for a vehicle of the present invention will be described in accordance with FIG. 13.

Note that the same reference numerals are applied to the same members as in the sixth embodiment, and description thereof is omitted.

Figure 13:
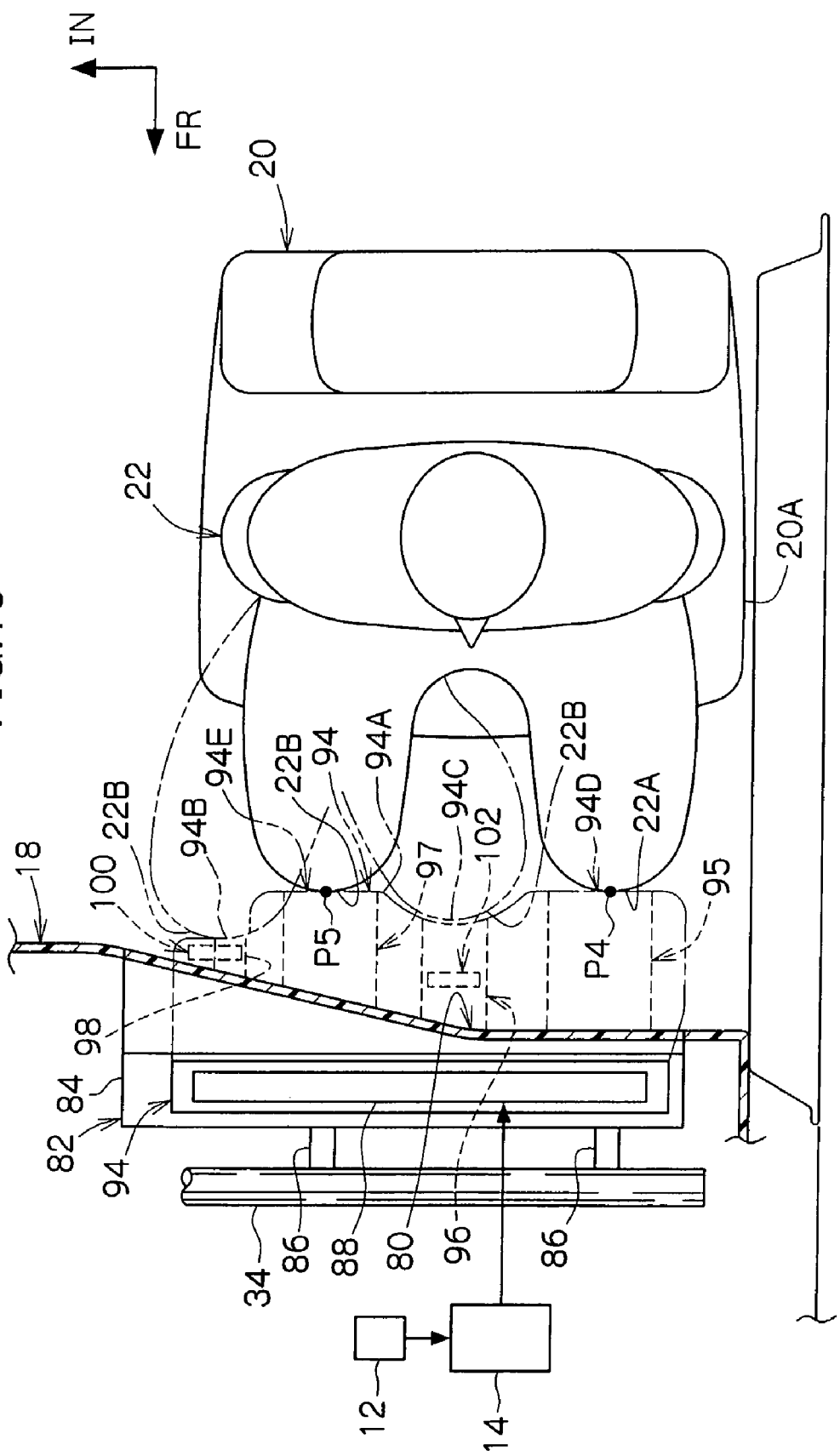
FIG. 13 is a schematic plan view, a portion of which is in cross-section, corresponding to FIG. 1 and showing an occupant protecting device for a vehicle relating to a seventh embodiment of the present invention.

As shown in FIG. 13, in the present embodiment, due to a plurality of connecting fabrics 95, 96, 97, 98, which are mounted at predetermined intervals in the vehicle transverse direction within an air bag body 94, a rear wall portion 94A of the air bag body 94 which has inflated and unfolded is, in the vehicle transverse direction, a curved configuration which is convex and concave in the vehicle body longitudinal direction.

Namely, at the air bag body 94A (94) which has inflated and unfolded, a region 94B, which is above an acceleration pedal which serves as an operation pedal of the vehicle, and a region 94C, which is above a brake pedal 102 which serves as an operation pedal of the vehicle, have smaller vehicle body longitudinal direction thicknesses in unfolded states as seen in a plan view of the vehicle body and are at positions further toward the front of the vehicle body, as compared with a left leg protecting portion 94D and a right leg protecting portion 94E.

Further, as shown by the solid line in FIG. 13, the knee air bag device 82 is mounted along the vehicle transverse direction.

Further, as shown by the two-dot chain line in FIG. 13, when the air bag body 94 inflates and unfolds, the leg restraining position P4 of the left leg protecting portion 94D at the air bag body 94 and the leg restraining position P5, in the longitudinal direction, of the right leg protecting portion 94E, are equal. Accordingly, at the time of a vehicle body collision, the left and right leg portions 22A, 22B of the occupant 22 seated in the front seat 20 can both be restrained at equal positions by the one air bag body 94.

Further, as shown by the two-dot chain line in FIG. 13, even in a case in which the right leg portion 22B is depressed toward the front of the vehicle body in order for the right leg portion 22B of the occupant 22 to operate the acceleration pedal 100 or the brake pedal 102, the right leg portion 22B of the occupant 22 can be restrained by the region 94B or the region 94C of the air bag body 94 which has inflated and unfolded.

Next, operation of the present embodiment will be described.

In the present embodiment, in the same way as in the fifth embodiment, at the time of a vehicle body collision, the left and right leg portions 22A, 22B of the occupant 22 seated in the front seat 20 can both be restrained at equal positions by the left leg protecting portion 94D and the right leg protecting portion 94E at the one air bag body 94.

Further, in the present embodiment, as shown by the two-dot chain line in FIG. 13, even in a case in which the right leg portion 22B is depressed toward the front of the vehicle body in order for the right leg portion 22B of the occupant 22 to operate the acceleration pedal 100 or the brake pedal 102, the right leg portion 22B of the occupant 22 can be restrained by the region 94B or the region 94C of the air bag body 94 which has expanded and unfolded. Therefore, the occupant can be restrained in a state of tending toward the front of the vehicle body.

Further, in the present embodiment, because the leg protecting means at the left and right is structured by the knee air bag device 82 which is equipped with the one air bag body 94, the structure can be made to be simple as compared with a structure in which the means is made to be separate knee air bag devices at the left and the right.

Note that the air bag body 94 is not limited to one air bag body, and may be divided into plural air bag bodies.

Next, an eighth embodiment of an occupant protecting device for a vehicle of the present invention will be described in accordance with FIG. 14.

Note that the same reference numerals are applied to the same members as in the fourth embodiment and the sixth embodiment, and description thereof is omitted.

Figure 14:
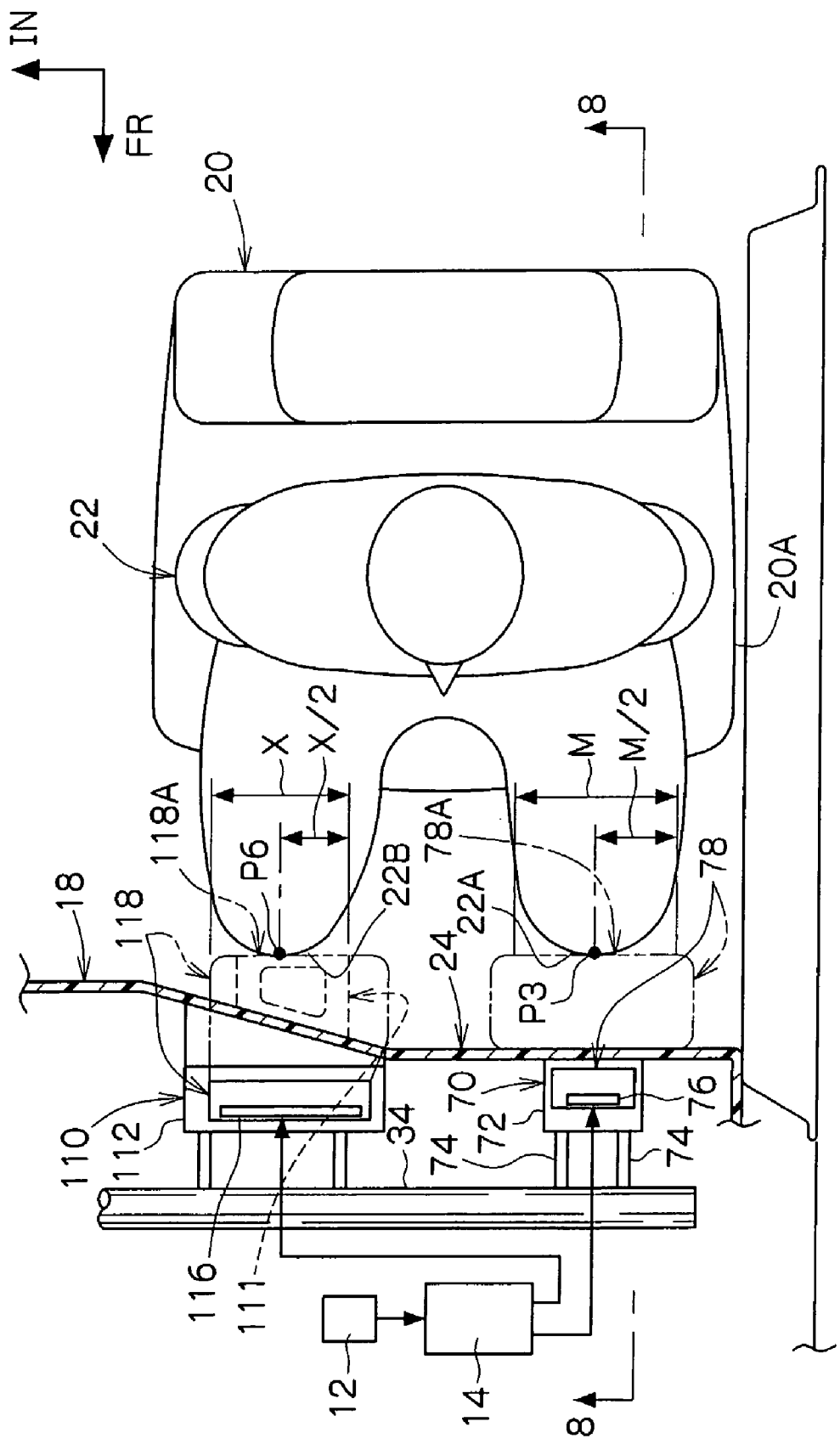
FIG. 14 is a schematic plan view, a portion of which is in cross-section, corresponding to FIG. 1 and showing an occupant protecting device for a vehicle relating to an eighth embodiment of the present invention.

As shown in FIG. 14, in the present embodiment, instead of the knee bolster 42 of the fourth embodiment (FIG. 7), a knee air bag device 110 serving as a right leg protecting means is mounted adjacent to the wall portion 24 at the vehicle body front side of the vehicle transverse direction inner side portion within the instrument panel 18.

Note that, similarly to the knee air bag device 82 of the sixth embodiment (FIG. 12), the knee air bag device 110 is structured to have a connecting fabric 111, and therefore, detailed description thereof will be omitted.

An inflator 116 serving as a driving means and an air bag body 118 are accommodated within a case 112 of the knee air bag device 110. Due to gas which is jetted out from the inflator 116, the air bag body 118 inflates and unfolds toward the right leg portion 22B of the occupant 22 as shown by the two-dot chain line in FIG. 14.

The inflator 116 of the knee air bag device 110 is connected to the control circuit 14. When the control circuit 14 judges, from an input signal from the acceleration sensor 12, that the vehicle body 10 has collided, the control circuit 14 operates the inflator 76.

As shown by the two-dot chain line in FIG. 14, due to the connecting fabric 111, the air bag body 118 inflates and unfolds such that an occupant side surface of a leg protecting portion 118A runs along the vehicle transverse direction. Further, a leg restraining position of the leg protecting portion 118A at the air bag body 118, and a leg restraining position of the leg protecting portion 78A at the air bag body 78 which has inflated and unfolded, are equal positions in the vehicle body longitudinal direction.

Namely, the point P3, which, at the leg restraining position of the air bag body 78 of the knee air bag device 70 shown by the two-dot chain line in FIG. 14, is the central position of the width M and the central position of the vertical length (see FIG. 8) of the occupant side surface abutting the left leg portion 22A of the occupant 22, and a point P6, which, at the leg restraining position of the air bag body 118 of the knee air bag device 110, is the central position of a width X and the central position of the vertical length (not shown) of the occupant side surface abutting the right leg portion 22B of the occupant 22, are equal positions.

Accordingly, at the time of a vehicle body collision, the left and right leg portions 22A, 22B of the occupant 22 seated in the front seat 20 can both be restrained at equal positions by the air bag bodies 78, 118.

Next, operation of the present embodiment will be described.

In the present embodiment, when the vehicle body 10 collides, the control circuit 14 judges from an input signal from the acceleration sensor 12 that the vehicle body 10 has collided, and operates the inflators 76, 116 of the knee air bag devices 70, 110. As a result, as shown by the two-dot chain lines in FIG. 14, due to the gasses from the inflators 76, 116, the air bag bodies 78, 118 inflate and unfold toward the left leg portion 22A and the right leg portion 22B of the occupant 22, respectively.

At this time, the leg restraining position of the leg protecting portion 118A at the air bag body 118 which has inflated and unfolded, and the leg restraining position of the leg protecting portion 78A at the air bag body 78 which has inflated and unfolded, are equal positions in the vehicle body longitudinal direction.

Accordingly, at the time of a vehicle body collision, the left and right leg portions 22A, 22B of the occupant 22 seated in the front seat 20 can both be restrained at equal positions by the air bag bodies 78, 118. Therefore, the leg portions of the occupant 22 seated in the front seat 20 can be reliably protected.

Further, in the present embodiment, as shown by the solid lines in FIG. 14, the knee air bag device 70 and the knee air bag device 110 can be mounted to the instrument panel 18 which has the wall portion 24 having, in the vehicle transverse direction, a curved configuration which is convex and concave in the vehicle body longitudinal direction. Therefore, there is no need to make the wall portion 24 of the instrument panel 18, which is the vehicle interior wall, be a rectilinear configuration running along the vehicle transverse direction, and the degrees of freedom in designing the shape of the wall portion 24 are improved.

Further, in the present embodiment, because the left and right leg protecting means are the knee air bag devices 70, 110, the degrees of freedom in designing the shape of the wall portion 24 can be improved as compared with a structure in which one of the leg protecting means is made to be the fixed-type knee bolster.

The present invention has been described in detail above with respect to specific embodiments, but the present invention is not to be limited to the above-described embodiments, and it will be apparent to those skilled in the art that various other embodiments are possible within the scope of the present invention.

For example, in the above-described embodiments, a point, which is the leg restraining position of the knee bolster main body and which is the central position of the width and the central position of the longitudinal length and the central position of the vertical length of the occupant side surface at the surface skin abutting the occupant leg portion, and a point, which is the leg restraining position of the active knee bolster main body and which is the central position of the width and the central position of the longitudinal length and the central position of the vertical length of the occupant side surface at the surface skin abutting the occupant leg portion, are made to be equal positions. However, instead, a point, which is the leg restraining position and is the central position of the width and the central position of the longitudinal length and the central position of the vertical length of the knee bolster main body, and a point, which is the central position of the width and the central position of the longitudinal length and the central position of the vertical length of the active knee bolster main body, may be made to be equal positions.

Further, at the leg restraining positions, the point which becomes the center of gravity of the knee bolster main body, and the point which becomes the center of gravity of the active knee bolster main body, may be made to be equal positions.

Further, at the leg restraining positions, the abutment starting point of the knee bolster main body with the occupant leg portion, and the abutment starting point of the active knee bolster main body with the occupant leg portion, may be made to be equal positions.

Further, at the leg restraining positions, the occupant leg supporting portion of the knee bolster main body, and the occupant leg supporting portion of the active knee bolster main body, may be made to be equal positions.

Further, the vehicle interior wall of the above-described respective embodiments is not limited to the instrument panel 18, and may be another vehicle interior wall such as a panel disposed beneath the instrument panel, or the like. Further, the curved configuration of the wall portion 24, 80 of the instrument panel 18 is not limited to the configurations of the above-described respective embodiments.

Further, the above-described respective embodiments are structured such that main body 30 of the active knee bolster 28 rotates and moves around the supporting shaft 38. However, instead, the main body 30 of the active knee bolster 28 may be another moving structure such as moving rectilinearly toward the leg portion of the occupant, or the like.

Further, the above-described respective embodiments are structured such that a collision of the vehicle body 10 is sensed by the acceleration sensor 12, but may be structured such that a collision of the vehicle body is sensed by using another collision sensing means such as a camera or the like.

Further, in the above-described respective embodiments, the respective leg restraining positions of the left and right leg restraining means are equal positions in the vehicle body longitudinal direction. However, instead, a structure may be used in which the occupant can be restrained at positions at which the respective leg restraining positions of the left and right leg restraining means differ in the vehicle body longitudinal direction in accordance with the posture, physique, seat placement angle, or the like of the occupant.

Further, the operation pedals of the vehicle are not limited to the acceleration pedal 100 and the brake pedal 102, and may be another operation pedal such as a clutch pedal or the like.

P1: point which is the widthwise central position, and the longitudinal length central position, and the vertical length central position of the occupant side surface of the knee bolster or the active knee bolster which is at the leg restraining position P2: point which is the widthwise central position, and the longitudinal length central position, and the vertical length central position of the occupant side surface of the knee bolster which is at the leg restraining position P3: point which is the widthwise central position and the vertical length central position of the occupant side surface of the knee air bag body which is at the leg restraining position P4: point which is the widthwise central position and the vertical length central position of the occupant side surface of the left leg protecting portion at the knee air bag body which is at the leg restraining position P5: point which is the widthwise central position and the vertical length central position of the occupant side surface of the right leg protecting portion at the knee air bag body which is at the leg restraining position P6: point which is the widthwise central position and the vertical length central position of the occupant side surface of the knee air bag body which is at the leg restraining position

The invention claimed is:

1. An occupant protecting device for a vehicle, comprising:
a vehicle interior wall disposed in front of a front seat, and having one side portion opposing a left leg position, and an other side portion opposing a right leg position, in a vehicle transverse direction, and having, in the vehicle transverse direction, a curved configuration which is convex and concave in a vehicle body longitudinal direction such that one of the one side portion and the other side portion protrudes toward the rear of the vehicle body;
left leg protecting means, mounted to the one side portion of the vehicle interior wall, for restraining a left leg portion of an occupant seated on a front seat at a time of a vehicle body collision; and
right leg protecting means, mounted to the other side portion of the vehicle interior wall, and having an accommodated position which is different from an accommodated position of the left leg protecting means in the longitudinal direction, for restraining a right leg portion of the occupant seated on the front seat at a time of a vehicle body collision, and a longitudinal leg restraining position of the right leg protecting means being equal to a longitudinal leg restraining position of the left leg protecting means.

2. The occupant protecting device for a vehicle of claim 1, wherein one of the left leg protecting means and the right leg protecting means is a fixed-type knee bolster, and another is an active knee bolster which, under a predetermined condition, moves from the accommodated position to the longitudinal leg restraining position.

3. The occupant protecting device for a vehicle of claim 1, wherein both of the left leg protecting means and the right leg protecting means are active knee bolsters which, under a predetermined condition, move from the accommodated positions to the longitudinal leg restraining positions.

4. The occupant protecting device for a vehicle of claim 1, wherein one of the left leg protecting means and the right leg protecting means is a fixed-type knee bolster, and another is a knee air bag device equipped with an air bag body which, under a predetermined condition, inflates and unfolds from the accommodated position to the longitudinal leg restraining position.

5. The occupant protecting device for a vehicle of claim 1, wherein both of the left leg protecting means and the right leg protecting means are knee air bag devices equipped with air bag bodies which, under a predetermined condition, inflate and unfold from the accommodated positions to the longitudinal leg restraining positions.

6. The occupant protecting device for a vehicle of claim 1, wherein the left leg protecting means and the right leg protecting means are structured by a knee air bag device equipped with one air bag body which, under a predetermined condition, inflates and unfolds from the accommodated position to the longitudinal leg restraining position.

7. The occupant protecting device for a vehicle of claim 1, wherein the longitudinal leg restraining position of the right leg protecting means is a point (P1, P5, P6) which is a central position of a width (W, T, X) and a central position of a longitudinal length (L) and a central position of a vertical direction length (H, R) of a surface skin at the surface skin portion of the right leg protecting means abutting the right leg portion, and the longitudinal leg restraining position of the left leg protecting means is a point (P2, P3, P4) which is a central position of a width (V, M, Q) and a central position of a longitudinal direction length and a central position of a vertical direction length (K, N, R) of a surface skin at the surface skin portion of the left leg protecting means abutting the left leg portion.

8. An occupant protecting device for a vehicle, comprising:
a vehicle interior wall disposed in front of a front seat;
left leg protecting means, mounted to the vehicle interior wall, for restraining a left leg portion of an occupant seated on a seat at a time of a vehicle body collision, the left leg protecting means being positioned in front of the left leg portion prior to deployment; and
right leg protecting means, mounted to the vehicle interior wall, for restraining a right leg portion of an occupant seated on a seat at a time of a vehicle body collision, the right leg protecting means being positioned in front of the right leg portion prior to deployment,
wherein the right leg protecting means is structured such that an accommodated position of the right leg protecting means is different, in a vehicle body longitudinal direction, than an accommodated position of the left leg protecting means, and a leg restraining position of the right leg protecting means is equal, in the vehicle body longitudinal direction, to a leg restraining position of the left leg protecting means.

9. An occupant protecting device for a vehicle, comprising:
a vehicle interior wall disposed in front of a front seat, and having one side portion opposing a left leg position, and an other side portion opposing a right leg position, in a vehicle transverse direction, and having, in the vehicle transverse direction, a curved configuration which is convex and concave in a vehicle body longitudinal direction; and
an air bag body mounted to the vehicle interior wall and having a left leg protecting portion and a right leg protecting portion for restraining left and right leg portions of an occupant seated on a seat at a time of a vehicle body collision, the left leg protecting portion being mounted on the one side of a vehicle interior wall and the right leg protecting portion being mounted on the other side of the vehicle interior wall,
wherein a vehicle body longitudinal direction thickness, in an inflated and unfolded state and as seen in a plan view of a vehicle body, of a region of the air bag body which region is above an operation pedal of a vehicle, is small as compared with vehicle body longitudinal direction thicknesses, in the inflated and unfolded state and as seen in the plan view of the vehicle body, of adjacent left and right regions,
the right leg protecting portion of the air bag body having an accommodated position which is different from an accommodated position of the left leg protecting portion of the air bag body in a vehicle longitudinal direction, and a longitudinal leg restraining position of the right leg protecting portion being equal to a longitudinal leg restraining position of the left leg protecting portion.

10. An occupant protecting device for a vehicle, comprising:
   a vehicle interior wall disposed in front of a front seat, and having one side portion opposing a left leg of an occupant seated on the front seat, and an other side portion opposing a right leg of the occupant, in a vehicle transverse direction, and having, in the vehicle transverse direction, a curved configuration which is convex and concave in a vehicle body longitudinal direction such that one of the one side portion and the other side portion protrudes toward the rear of the vehicle body;
   left leg protecting means, mounted to one of the one side portion and the other side portion of the vehicle interior wall, for restraining a left leg portion of the occupant seated on the front seat at a time of a vehicle body collision; and
   right leg protecting means, mounted to the other of the one side portion and the other side portion of the vehicle interior wall, and having an accommodated position which is different from an accommodated position of the left leg protecting means in the longitudinal direction, for restraining a right leg portion of an occupant seated on a seat at a time of a vehicle body collision,
   wherein at least one of the left leg protecting means or the right leg protecting means is structured so as to rupture the vehicle interior wall and unfold at the time of the vehicle body collision, and
   the right leg protecting means is structured such that a leg restraining position of the right leg protecting means is equal, in the vehicle body longitudinal direction, to a leg restraining position of the left leg protecting means.

11. The occupant protecting device for a vehicle of claim 10, wherein the leg protecting means, which is structured so as to rupture the vehicle interior wall and unfold at the time of a vehicle body collision, is an active knee bolster.

12. The occupant protecting device for a vehicle of claim 10, wherein the leg protecting means, which is structured so as to rupture the vehicle interior wall and unfold at the time of a vehicle body collision, is a knee air bag device.

13. The occupant protecting device for a vehicle of claim 10, wherein the left leg protecting means and the right leg protecting means are structured by a knee air bag device equipped with one air bag body which, under a predetermined condition, inflates and unfolds from the accommodated position to the leg restraining position.

14. The occupant protecting device for a vehicle of claim 13, wherein the air bag body is structured such that a vehicle body longitudinal direction thickness, in an inflated and unfolded state and as seen in a plan view of a vehicle body, of a region of the air bag body which region is above an operation pedal of a vehicle, is small as compared with vehicle body longitudinal direction thicknesses, in the inflated and unfolded state and as seen in the plan view of the vehicle body, of adjacent left and right regions.

15. An occupant protecting device for a vehicle, comprising:
   a vehicle interior wall disposed in front of a front seat;
   left leg protecting means, mounted to the vehicle interior wall, for restraining a left leg portion of an occupant seated on a seat at a time of a vehicle body collision, the left leg protecting means being positioned in front of the left leg portion prior to deployment; and
   right leg protecting means, mounted to the vehicle interior wall, for restraining a right leg portion of an occupant seated on a seat at a time of a vehicle body collision, wherein at least one of the left leg protecting means or the right leg protecting means is structured so as to rupture the vehicle interior wall and unfold at a time of a vehicle body collision, the right leg protecting means being positioned in front of the right leg portion prior to deployment, and
   the right leg protecting means is structured such that an accommodated position of the right leg protecting means is different, in a vehicle body longitudinal direction, than an accommodated position of the left leg protecting means, and a leg restraining position of the right leg protecting means is equal, in the vehicle body longitudinal direction, to a leg restraining position of the left leg protecting means.

* * * * *